United States Patent [19]
Kuba

[11] Patent Number: 5,623,365
[45] Date of Patent: Apr. 22, 1997

[54] DIFFRACTIVE OPTICAL ELEMENT FOR USE WITHIN A PROJECTION LENS SYSTEM

[75] Inventor: Keiichi Kuba, Hachioji, Japan

[73] Assignee: Olympus Optical Co., Ltd., Tokyo, Japan

[21] Appl. No.: 245,554

[22] Filed: May 18, 1994

[30] Foreign Application Priority Data

May 19, 1993 [JP] Japan .................................. 5-116791

[51] Int. Cl.⁶ .................................. G02B 27/44; G02B 13/18
[52] U.S. Cl. .......................... 359/569; 359/565; 359/721; 359/742
[58] Field of Search .................................. 359/565, 728, 359/721, 708, 742, 648, 569, 571, 574, 575, 566, 724

[56] References Cited

U.S. PATENT DOCUMENTS

| | | | |
|---|---|---|---|
| 4,936,665 | 6/1990 | Whitney | 350/451 |
| 5,156,943 | 10/1992 | Whitney | 430/321 |
| 5,170,207 | 12/1992 | Tezuka et al. | 355/53 |
| 5,218,471 | 6/1993 | Swanson et al. | 359/569 |
| 5,227,915 | 7/1993 | Grossinger et al. | 359/575 |
| 5,309,283 | 5/1994 | Kreitzer | 359/648 |
| 5,353,156 | 10/1994 | Chung | 359/708 |
| 5,367,405 | 11/1994 | Sado | 359/708 |
| 5,386,319 | 1/1995 | Whitney | 359/575 |

OTHER PUBLICATIONS

Miyamoto, "The Phase Fresnel Lens", Journal of the Optical Society of America, vol. 51, No. 1, Jan. 1961, pp. 17–20.

William C. Sweatt, "New Methods of Designing Holographic Optical Elements", SPIE, vol. 126, Clever Optics (1977), pp. 46–53.

*Primary Examiner*—Timothy P. Callahan
*Assistant Examiner*—Terry L. Englund
*Attorney, Agent, or Firm*—Cushman, Darby & Cushman IP Group of Pillsbury Madison & Sutro LLP

[57] ABSTRACT

A projection lens system with a high resolving power and a wide exposure area which is effectively corrected for various aberrations including chromatic aberration and which is compact and has minimal production problems in a case where there is a limitation on vitreous materials usable as a lens material. The projection lens system (10) includes a plurality of lenses, at least one of which is a diffractive optical element (DOE) (11). The DOE (11) has a pitch arrangement in which it has a positive power in a paraxial region thereof, and wherein the positive power continuously changes to a less positive power, and then to a negative power as the distance from the optical axis of the DOE (11) increases toward the periphery thereof. Since the DOE (11) produces large aberrations which are opposite in sign to aberrations produced in the refracting system, it is possible to effectively correct various aberrations in the projection lens system (10) and also axial chromatic aberration. The above-described pitch arrangement allows an enlargement of the otherwise conventional tendency to reduce the minimum pitch of the DOE (11).

28 Claims, 16 Drawing Sheets

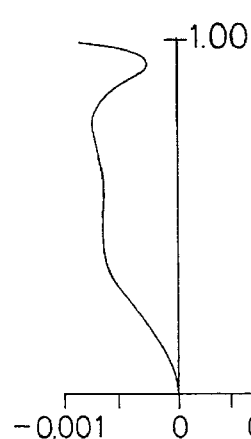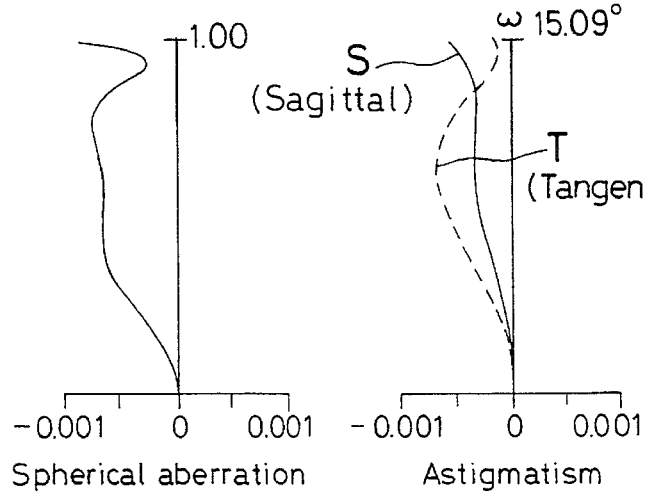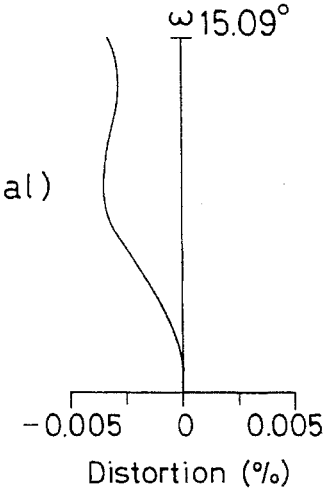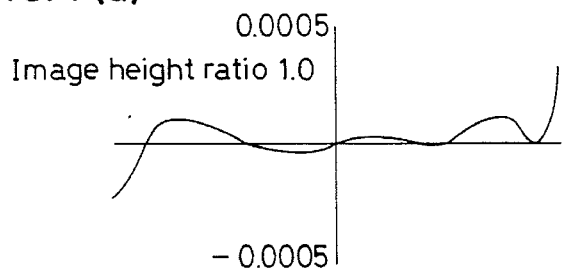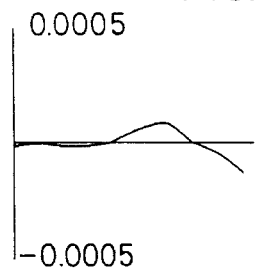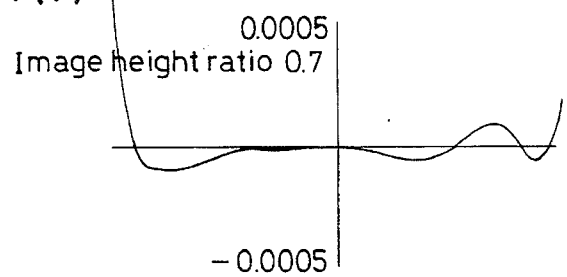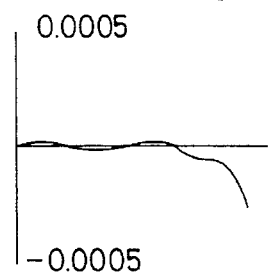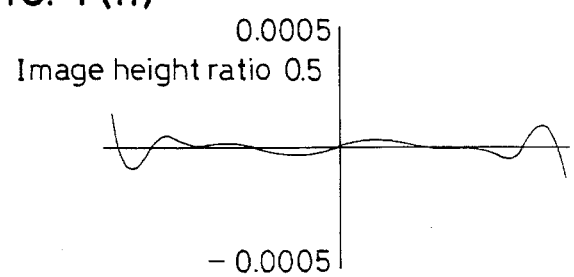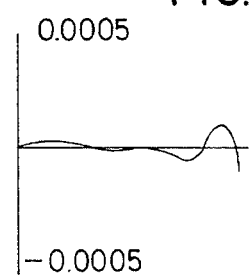

FIG. 10(a)
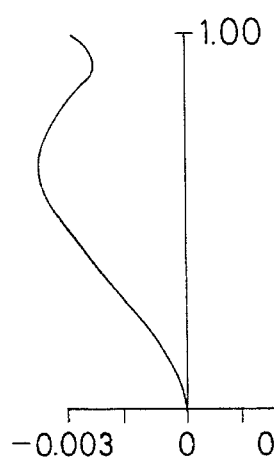
Spherical aberration
FIG. 10(b)
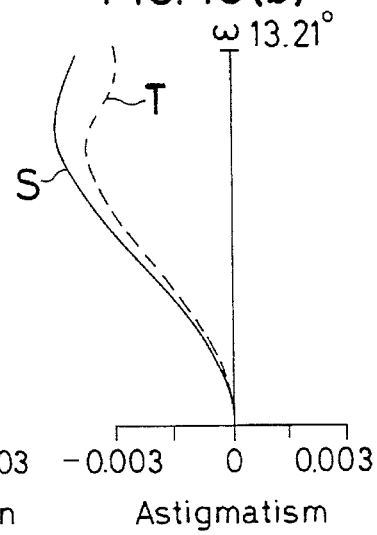
Astigmatism
FIG. 10(c)
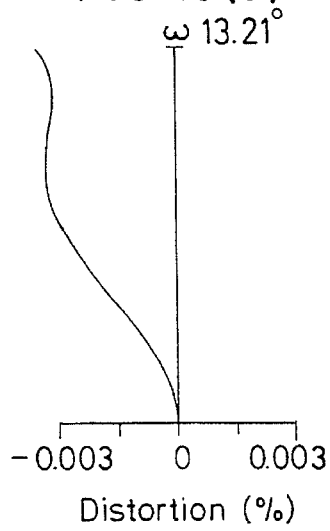
Distortion (%)
FIG. 10(d)
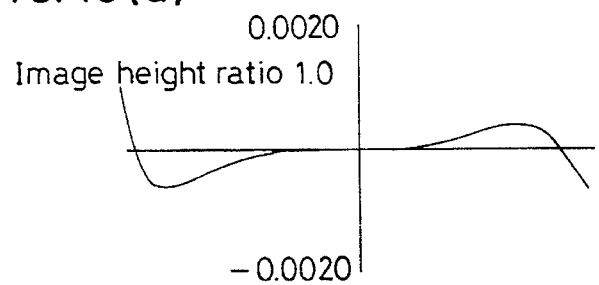
FIG. 10(f)
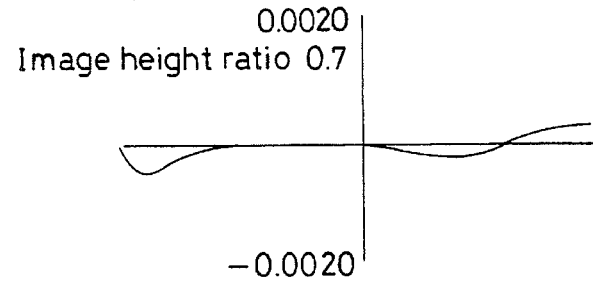
FIG. 10(h)
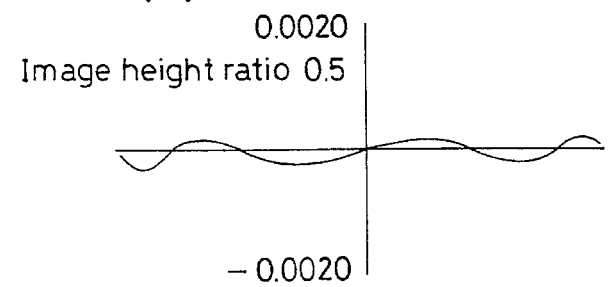
(Tangential)
FIG. 10(e)
FIG. 10(g)
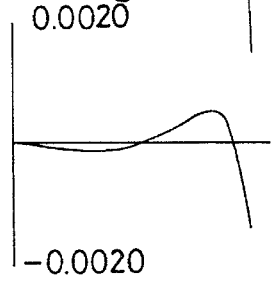
FIG. 10(i)
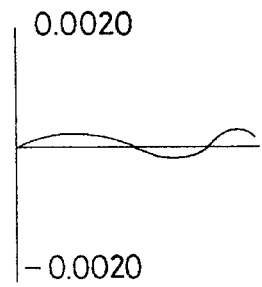
(Sagittal)
Coma Spherical aberration ω 14.40°
Astigmatism ω 14.40°
Distortion (%)

Image height ratio 1.0

Image height ratio 0.7

Image height ratio 0.5

(Tangential)　　　(Sagittial)

Coma (Tangential)     (Sagittal)

Coma

DIFFRACTIVE OPTICAL ELEMENT FOR USE WITHIN A PROJECTION LENS SYSTEM

BACKGROUND OF THE INVENTION

The present invention relates to a stepping projection aligner (hereinafter referred to as "stepper") which is designed to form a fine-line pattern of an integrated circuit (IC), a large-scale integrated circuit (LSI), etc., on a semiconductor substrate by exposure. More particularly, the present invention relates to a projection lens system which is useful to form by exposure an integrated circuit pattern on a semiconductor substrate by using a light source which emits light in the wavelength range of from the ultraviolet region to the vacuum ultraviolet region, i.e., of the order of 300 nm to 150 nm, for example, an excimer laser.

Hitherto, a stepper has been used to form a pattern of an IC, LSI, liquid crystal display, thin-film magnetic head, etc., on a semiconductor or other substrate by exposure. With the recent achievement of high integration density of integrated circuits, the projection lens system of the stepper has also been demanded to have a higher resolving power and a wider exposure area.

In general, the following relations hold between the resolving power and depth of focus of a lens system, the wavelength and the numerical aperture:

Resolving power=$k_1 \cdot \lambda/NA$

Depth of focus=$k_2 \cdot \lambda/NA^2$ where $\lambda$ is the wavelength; NA is the numerical aperture and $k_1$ and $k_2$ are proportional constants depending upon the process.

Accordingly, it is necessary in order to improve the resolving power of the projection lens system to shorten the exposure wavelength used or to increase the NA. However, the scheme of increasing the NA invites a rapid reduction of the depth of focus and also involves difficulty in optical design.

Under these circumstances, it has been proposed to achieve high resolving power by using a shorter exposure wavelength. More specifically, since it has become impossible to obtain resolving power sufficient for the present demand with the g-line (436 nm) and i-line (365 nm) of a super-high pressure mercury lamp used in the conventional steppers, KrF excimer laser (248 nm) and ArF excimer laser (193 nm) are considered to be promising as being next generation light sources.

On the other hand, the conventional practice for widening the exposure area of a projection lens system is to increase the object-image distance of the projection lens system (i.e., to multiply the projection optical system by a coefficient) or to use an aspherical lens. The former practice intends to enlarge the exposure area by multiplying the projection optical system by a coefficient because there is a limit to the achievement of a wider exposure area as long as spherical quartz lenses are used as in the conventional practice.

Incidentally, when an excimer laser is used as a light source in order to improve the resolving power, some problems arise: That is, since the half-width of excimer laser light is as large as 0.3 nm to 0.4 nm in a free run, the projection lens system needs achromatism. However, in the wavelength region of excimer laser light, the transmittance of ordinary glass is insufficient, and hence usable vitreous materials are limited to quartz, fluorite, $MgF_2$, etc. Fluorite is low in hardness and hence damageable and cannot readily be subjected to optical polishing. $MgF_2$ is deliquescent and anisotropic. Thus, vitreous materials other than quartz suffer from problems in terms of processability. Accordingly, a vitreous material that is practically usable for a projection lens system is limited to quartz.

With the above-described background, it is a common practice to form a projection lens system using monochromatic design lens elements made only of quartz and to narrow the wavelength spectral bandwidth of the light source, thereby preventing generation of chromatic aberration in the optical system. However, the optical system having such an arrangement suffers from the following problems:

① As the result of narrowing the wavelength spectral band, the laser output lowers.

② The laser becomes complicated to maintain the center wavelength, the spectral half-width, etc. with high accuracy.

③ Since the spectral half-width allowed for the light source is inversely proportional to $NA^2$, the allowable half-width becomes extremely small as the NA of the projection lens system is increased with the achievement of high integration density of devices.

The scheme of widening the exposure area of the projection lens system involves the following problems: If the object-image distance is increased by coefficient-multiplying the projection lens system, the projection optical system becomes exceedingly large in size, and the stepper eventually becomes incapable of being accommodated in a conventional clean room; otherwise a gigantic clean room is needed.

Further, since the spectral half-width required for the light source is inversely proportional to the focal length of the projection lens, the scheme of coefficient-multiplying the optical system unfavorably necessitates further narrowing the spectral band.

In the case of refracting lenses, spherical and aspherical lenses are produced by different methods, and it is not easy to produce a highly accurate aspherical lens as is required for a stepper lens.

To solve these problems, a projection lens system that uses a diffractive optical element has been proposed, as is disclosed in Japanese Patent Application Post-Exam Publication No. JP-A-4-214516 (1992) (corresponding to U.S. Pat. Nos. 4,936,665, 5,156,943 and 5,386,319.

However, if the diffractive optical element is provided with only a positive power action for mainly correcting chromatic aberration, the pitch at the most peripheral portion of the effective aperture radius region of the diffractive optical element becomes exceedingly small, so that the production of the diffractive optical element becomes extremely difficult. Moreover, the effect of correcting aberrations other than chromatic aberration is not satisfactorily large.

Thus, many problems are attendant on the conventional projection optical system with a high resolving power and a wide exposure area that uses an excimer laser as a light source.

SUMMARY OF THE INVENTION

In view of the above-described problems, an object of the present invention is to provide a projection lens system with a high resolving power and a wide exposure area which is effectively corrected for various aberrations including chromatic aberration and which is compact and has minimal production problems in a case where there is a limitation on vitreous materials usable as a lens material.

To attain the above-described object, the present invention provides a projection lens system including a plurality of refracting lens elements and a diffractive optical element (hereinafter referred to as "DOE"), wherein the DOE has a pitch arrangement in which it has a positive power in a paraxial region thereof, and the positive power continuously changes to a less positive power and then to a negative power as the distance from the optical axis of the DOE increases toward the periphery thereof.

In this case, a portion of the middle part of the DOE where the power becomes zero in the course of changing from a positive power to a negative power (i.e., no-power portion) preferably lies at a position that satisfies the following condition:

$$h/2 \leq p$$

where h is the effective aperture radius of the DOE, and
p is the distance from the optical axis to the no-power portion of the DOE.

Further, it is preferable that the pitch of the DOE should be the smallest at the most peripheral portion of the effective aperture diameter region of the DOE.

It is practical that the refracting lens elements other than the DOE are made of the same vitreous material. It is more practical that the vitreous material is quartz.

The DOE and the refracting lens elements may be made of quartz.

The projection lens system may be used in combination with a light source that emits a radiation of wavelength not longer than 300 nm. Examples of light sources usable in this case include excimer lasers, more specifically, KrF, ArF and $F_2$ excimer lasers.

Further, it is preferable that the projection lens system should have a 1-st lens unit (12) and a 2-nd lens unit (13), each including a pair of lenses which have respective concave surfaces facing each other, and the projection lens system should include a positive lens unit (14) disposed between the 1-st and 2-nd lens units (12 and 13).

In this case, the DOE may be disposed in the 2-nd lens unit (13) or at the image side of the 2-nd lens unit (13).

The arrangement may also be such that the positive lens unit (14) includes at least two positive lenses, and the DOE is disposed at the image side of the 2-nd lens unit (13).

In the present invention, a substrate on which a diffraction surface of the DOE is formed may be a plate having parallel flat surfaces.

The DOE may have a diffraction surface blazed or approximatively blazed for light of a predetermined order of diffraction. In the latter case, the blazed diffraction surface may be approximated by multi-level steps.

Further, it is preferable in the present invention to satisfy the following condition:

$$t/h \leq 0.4$$

where h is the effective aperture radius of the DOE, and
t is the height of the most off-axis chief ray in the DOE.

In this case, it is even more preferable to satisfy the following condition:

$$t/h \leq 0.3$$

In the present invention, the DOE in the projection lens system produces large aberrations which are opposite in sign to aberrations produced in the refracting system. It is therefore possible to effectively correct various aberrations in the projection lens system. Since the DOE has a positive power in a paraxial region thereof, axial chromatic aberration is also effectively corrected. Further, since the DOE has a pitch arrangement in which the power continuously changes from a positive power to a negative power as the distance from the optical axis of the DOE increases toward the periphery thereof, the minimum pitch of the DOE is not very small.

Consequently, it is possible to provide a projection lens system with a high resolving power and a wide exposure area which is effectively corrected for various aberrations including chromatic aberration and which is compact and has minimal production problems even in a case where there is a limitation on vitreous materials usable as a lens material.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7(a) to 7(i) graphically show spherical aberration, astigmatism, distortion and coma in the first example.

FIG. 10(a) to 10(i) graphically show various aberrations in a projection lens system using a DOE that performs a convex lens action, in a similar manner to FIGS. 7(a) to 7(i).

DESCRIPTION OF THE PREFERRED EMBODIMENTS

Examples of the projection lens system according to the present invention will be described below with reference to the accompanying drawings.

First, a method of designing an optical system including a DOE used in the present invention will be explained.

The principle of a DOE used in the present invention, which is an optical element based on a diffractive phenomenon, is detailed, for example, in Chapters VI and VII of "Small-Sized Optical Elements for Optical Designers" (Optronics). Let us explain it briefly.

Figure 1:
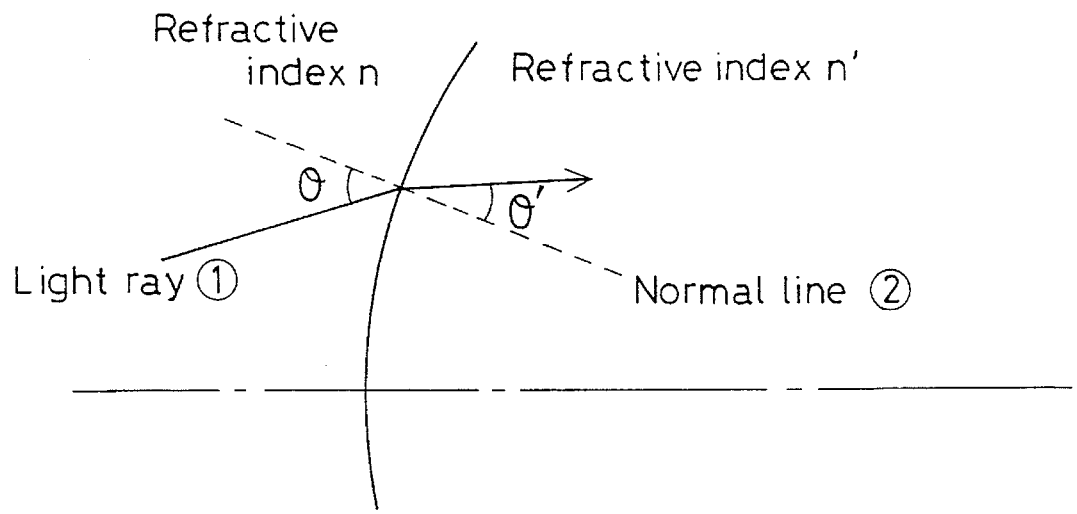
FIG. 1 shows the principle of refraction to explain a DOE used in the present invention.
Figure 2:
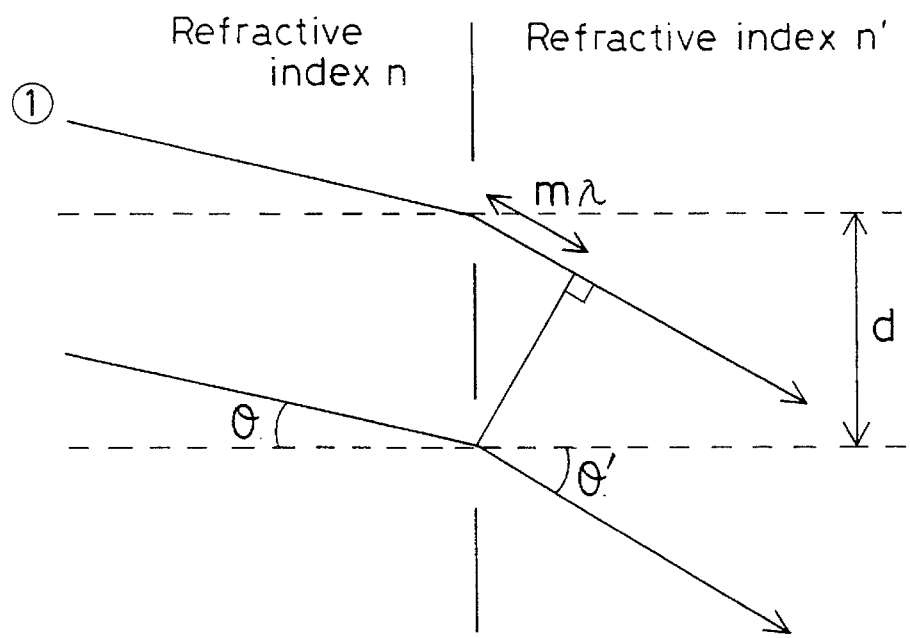
FIG. 2 shows the principle of diffraction to explain a DOE used in the present invention.
Figure 3:
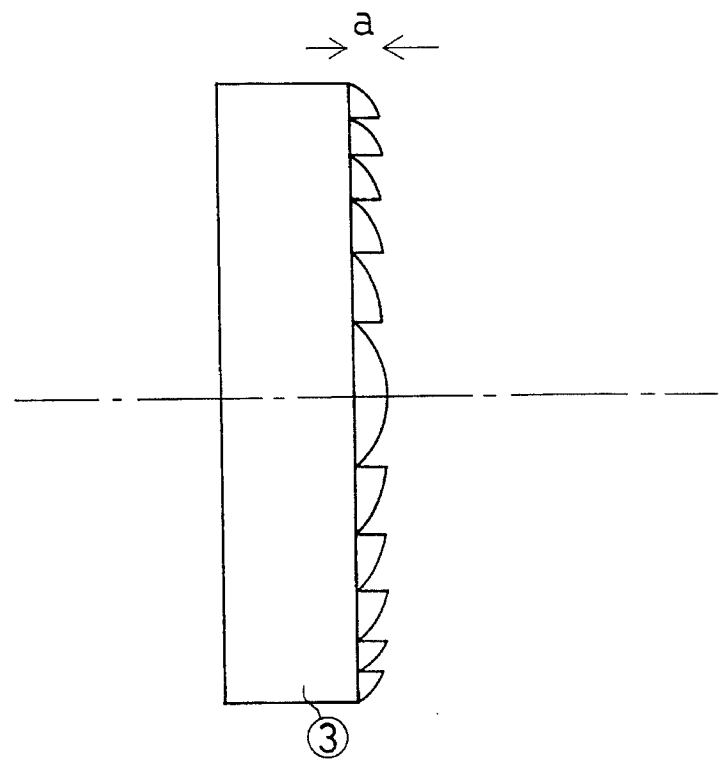
FIG. 3 is a sectional view of a blazed DOE.

In the case of an optical element based on a refractive phenomenon, a light ray ① is bent, as shown in FIG. 1, on the basis of Snell's law given by $$n \cdot \sin\theta = n' \cdot \sin\theta' \quad (1)$$

where n: the refractive index of the entrance-side medium
n': the refractive index of the exit-side medium
θ: the angle of incidence of the ray
θ': the angle of emergence of the ray On the other hand, in the case of a DOE, a light ray ① is bent, as shown in FIG. 2, by a diffractive phenomenon expressed by $$n \cdot \sin\theta - n' \cdot \sin\theta' = m\lambda/d \quad (2)$$

where n: the refractive index of the entrance-side medium
n': the refractive index of the exit-side medium
θ: the angle of incidence of the ray
θ': the angle of emergence of the ray
m: the order of diffraction
λ: the wavelength
d: the pitch of the DOE FIG. 3 is an enlarged sectional view of one example of a DOE. The DOE ③ comprises a transparent substrate having a large number of concentric narrow grooves formed on a surface thereof. The grooves form a sawtooth cross-sectional configuration, as illustrated in the figure. Thus, the DOE ③ has been blazed so that the diffraction efficiency for a specific order of diffraction is particularly high.

Figure 4:
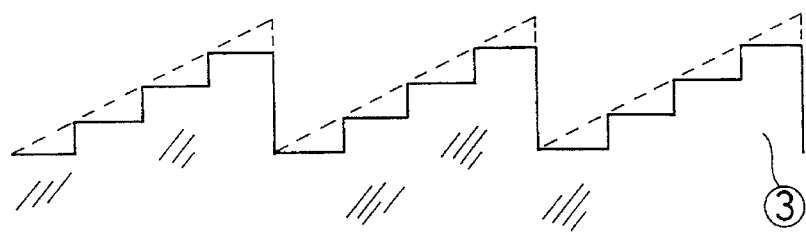
FIG. 4 is a sectional view of an approximatively blazed DOE.

FIG. 4 shows the cross-sectional configuration of the grooves in more detail. Although the grooves are shown considerably large in FIG. 3, the actual grooves are extremely narrow. Accordingly, in many cases, it is difficult to form smooth groove surfaces in terms of manufacturing technique. In such a case, the slant surfaces of the blazed grooves having a sawtooth cross-section may be approximated by multi-level steps, as shown in FIG. 4. Such slant surfaces approximated by multi-level steps can be produced by a processing technique combining together pattern exposure and etching, which are carried out in the semiconductor manufacturing process. Thus, a DOE having slant surfaces approximated by multi-level steps can be realized more easily than one that has smooth slant surfaces.

To effect blazing for mth-order diffracted light, the depth a of the grooves having a Fresnel lens-like cross section, as shown in FIG. 3, should preferably be set according to the following equation:

$$a = m \cdot \lambda/(n''-1)$$

where n'': the refractive index of the substrate of the DOE ③.

As a technique of designing an optical system including a DOE, Sweatt model is known; this is detailed in W. C. Sweatt "NEW METHODS OF DESIGNING HOLOGRAPHIC OPTICAL ELEMENTS", SPIE, Vol. 126, pp. 46–53 (1977) Sweatt model will be briefly explained below with reference to FIG. 5.

Figure 5:
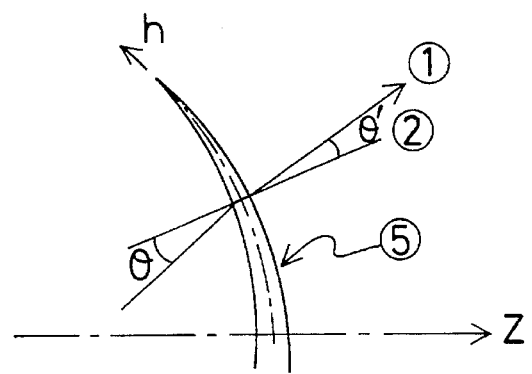
FIG. 5 is a view for explanation of an ultra-high index lens.

In FIG. 5, reference numeral ⑤ denotes a refracting lens (ultra-high index lens) in which n>>1, and ② a normal line. Reference symbol z denotes coordinates in the direction of an optical axis, h a coordinates in the direction lying along the substrate.

According to the above-mentioned paper, the following equation holds:

$$(n_u - 1) dz/dh = n \cdot \sin\theta - n' \cdot \sin\theta' \quad (3)$$

where $n_u$: the refractive index of the ultra-high index lens ($n_u = 10001$ in the design explained below)
z: the coordinates of the ultra-high index lens in the optical axis direction
h: the distance from the optical axis
n: the refractive index of the entrance-side medium
n': the refractive index of the exit-side medium
θ: the angle of incidence of the ray
θ': the angle of emergence of the ray Therefore, the following equation holds from Eqs. (2) and (3):

$$(n_u - 1) dz/dh = m\lambda/d \quad (4)$$

That is, the equivalent relationship expressed by Eq. (4) is established between "the surface configuration of the ultra-high index lens in which n>>1" and "the pitch of the DOE". Accordingly, the pitch distribution on the DOE can be obtained from the surface configuration of the ultra-high index lens designed on the basis of Sweatt model. More specifically, let us assume that the ultra-high index lens is designed as an aspherical lens defined by $$z = ch^2/\{1 + [1 - c^2(k+1)h^2]^{1/2}\} + Ah^4 + Bh^6 + Ch^8 + Dh^{10} \quad (5)$$

where z: the displacement (sag value) from a plane tangent to the lens at the optical axis
c: the curvature
h: the distance from the optical axis
k: the conical constant
A: the 4th-order aspherical coefficient
B: the 6th-order aspherical coefficient
C: the 8th-order aspherical coefficient
D: the 10th-order aspherical coefficient From Eqs. (4) and (5), $$d = m\lambda/[(n-1)dz/dh] \quad (6)$$
$$= [m\lambda/(n-1)] \times [ch/[1-c^2(k+1)h^2]^{1/2} + 4Ah^3 + 6Bh^5 + 8Ch^7 + 10Dh^9]^{-1}$$

Thus, a pitch (d) distribution on the DOE should be determined according to Eq. (6). Although in the following examples aspherical surface terms for only 4th- to 10th-orders are used, it should be noted that aspherical surface terms for 12th-, 14th- . . . orders may be used, as a matter of course.

It will be understood from Eq. (6) that as the order m of diffraction is increased, the pitch d increases, and the production of the DOE becomes easier. In the following examples, m is defined as m=+1 for simplification of the explanation.

(FIRST EXAMPLE)

Figure 6:
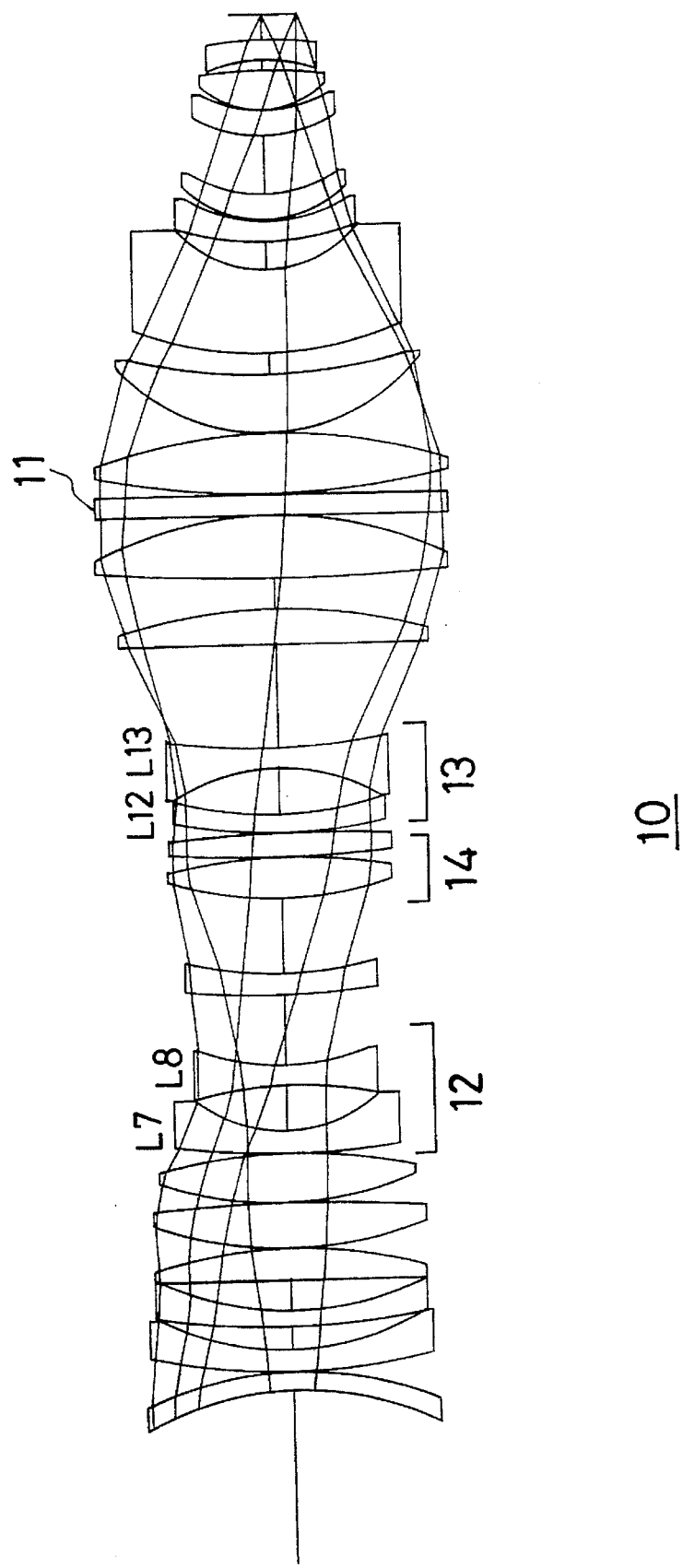
FIG. 6 is a sectional view of a projection lens system in a first example of the present invention.
Figure 8:
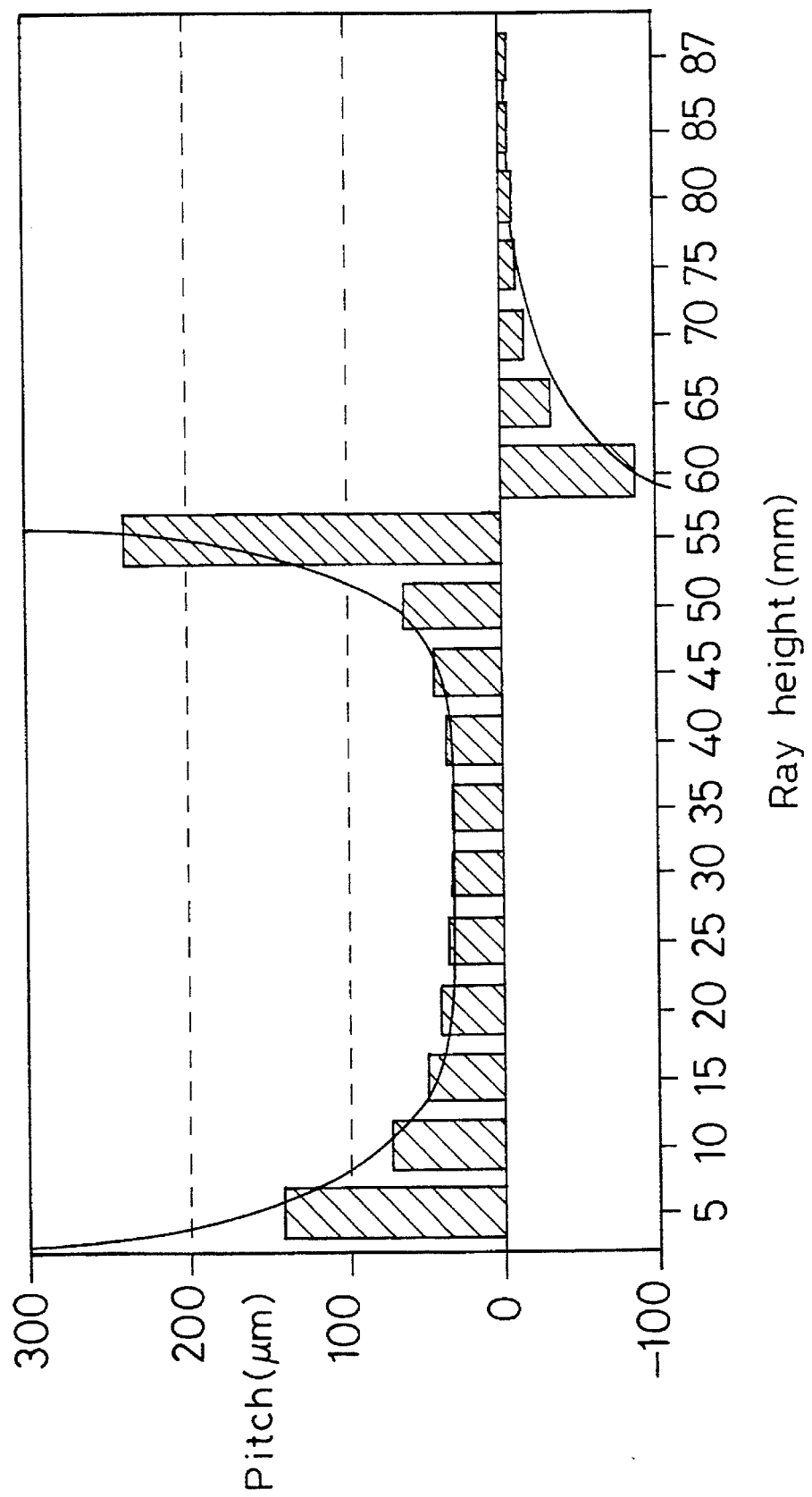
FIG. 8 is a graph showing a pitch distribution on a DOE used in the projection lens system of the first example of the present invention.

Numerical data on a projection lens system in this example will be shown later. FIG. 6 is a sectional view of the projection lens system, and FIG. 7(a) to 7(i) graphically show spherical aberration, astigmatism, distortion and coma in the projection lens system. FIG. 8 shows the pitch arrangement of a DOE used in the projection lens system of this example. In FIG. 6, reference numeral 11 denotes a DOE. In FIG. 8, the minus pitch shows that the DOE has a concave lens action. Table 1 below shows third-order aberrations produced in the DOE and refracting system of the projection lens system in the first example, together with those in modifications of the first example.

TABLE 1

Third-order aberrations in the projection lens system (FN 36) in the first example, and changes of the third-order aberrations when the field number is further enlarged (FN 46 and FN 60) where
FN: field number (exposure area)
SA: spherical aberration
TCO: tangential coma
TAS: tangential astigmatism
SAS: sagittal astigmatism
DST: distortion
PTZ: Petzval sum

|  | FN 36 (first example) | | | |
| --- | --- | --- | --- | --- |
|  | Spherical action | Aspherical action | FN 48 | FN 60 |
| Aberrations produced in DOE | | | | |
| SA | −0.002 | 10.354 | 18.088 | 26.182 |
| TCO | 0.018 | 0.299 | 9.785 | 26.181 |
| TAS | −0.084 | 0.003 | 1.614 | 8.488 |
| SAS | −0.028 | 0.001 | 0.538 | 2.829 |
| DST | −0.001 | 0.000 | 0.079 | 0.890 |
| PTZ | 0 | 0 | 0 | 0 |
| Aberrations produced in refracting system | | | | |
| SA |  | −10.357 | −18.092 | −26.184 |
| TCO |  | −0.315 | −9.785 | −26.183 |
| TAS |  | 0.079 | −1.615 | −8.489 |
| SAS |  | 0.026 | −0.538 | −2.829 |
| DST |  | −0.004 | −0.088 | −0.913 |
| PTZ |  | −0.000 | −0.000 | 0.000 |
| p in Cond. (1) |  | 0.65 h | 0.45 h | 0.33 h |

The projection lens system 10 in this example places great importance on enlargement of the exposure area. To achieve a wide exposure area, it is even more important to correct field curvature and hence necessary to correct Petzval sum satisfactorily. The projection lens system 10 has two lens units, each including a pair of lenses which have respective concave surfaces facing each other, that is, a lens unit 12 composed of lenses L7 and L8, and a lens unit 13 composed of lenses L12 and L13. In addition, a convex lens unit 14 is disposed between the two lens units 12 and 13. With this arrangement, the ray height at the above-described concave surfaces is made relatively low, and the Petzval sum is corrected by the concave surfaces with a relatively strong negative power. Since the DOE 11 is equivalent to a refracting lens having an infinite refractive index, it does not aggravate the Petzval sum. For these reasons, the projection lens system 10 in this example has a favorable Petzval sum.

In the case of a stepper lens, the correction of spherical aberration is particularly important, and with regard to chromatic aberration, it is important to correct a shift of the Gaussian image surface (axial chromatic aberration) caused by a wavelength fluctuation. Accordingly, it is preferable to dispose a DOE in the vicinity of the pupil or at a position at which the marginal ray height is high, that is, where spherical aberration and axial chromatic aberration can be effectively corrected, as disclosed in Japanese Patent Application Laid-Open (KOKAI) Nos. 2-1109 (1990) (corresponding to U.S. Pat. No. 5,170,207) and 4-214516 (1992). Therefore, in this example, the DOE 11 is disposed at a position where the marginal ray height is high.

In the case of a stepper lens, it is preferable to satisfy the following condition in order to correct spherical aberration and axial chromatic aberration as described above:

$$t/h \leqq 0.4 \quad (a)$$

where h is the effective aperture radius of the DOE, and t is the height of the most off-axis chief ray in the DOE.

It is even more preferable to satisfy the following condition:

$$t/h \leqq 0.3 \quad (a)'$$

These conditions relate to the position of the DOE. The most effective scheme is to dispose in a plurality of refracting lens elements a DOE which has a pitch arrangement in which it has a positive power in a paraxial region thereof, and the positive power continuously changes to a negative power as the distance from the optical axis of the DOE increases toward the periphery thereof. As a matter of course, t/h=0 shows that the DOE lies at the pupil position, and as t/h becomes larger, the position of the DOE comes away from the pupil position. If t/h exceeds 0.4, the position of the DOE is excessively away from the pupil position, thus weakening the effect of correcting various aberrations including spherical aberration and axial chromatic aberration.

In the lens system of the first example and those of the second and third examples (described later), a position where the marginal ray height is high is rather close to the pupil position. Incidentally, t/h in each example is as follows:

First example (FIG. 6): t/h=0.157
Second example (FIG. 14): t/h=0.0167
Third example (FIG. 17): t/h=0.261

The DOE 11 in the first example has a pitch arrangement as shown in FIG. 8. As the distance from the optical axis of the DOE 11 increases toward the periphery of the effective aperture diameter region of the DOE 11, the power of the DOE 11 continuously changes from a positive power to a negative power as follows: weak convex lens action (large pitch)→strong convex lens action (small pitch)→weak convex lens action (large pitch)→no power→weak concave lens action (large pitch)→strong concave lens action (small pitch). In other words, the DOE 11 has an exceedingly strong aspherical action. When it is intended to provide an ordinary refracting lens with such strong aspherical action, the aspherical configuration becomes complicated, so that it is extremely difficult to effect processing of high accuracy. However, in the case of DOEs, the production of a DOE having aspherical action such as that in this example is the same as that of a DOE having ordinary spherical action; there is no difference in the manufacturing difficulty.

Figure 9:
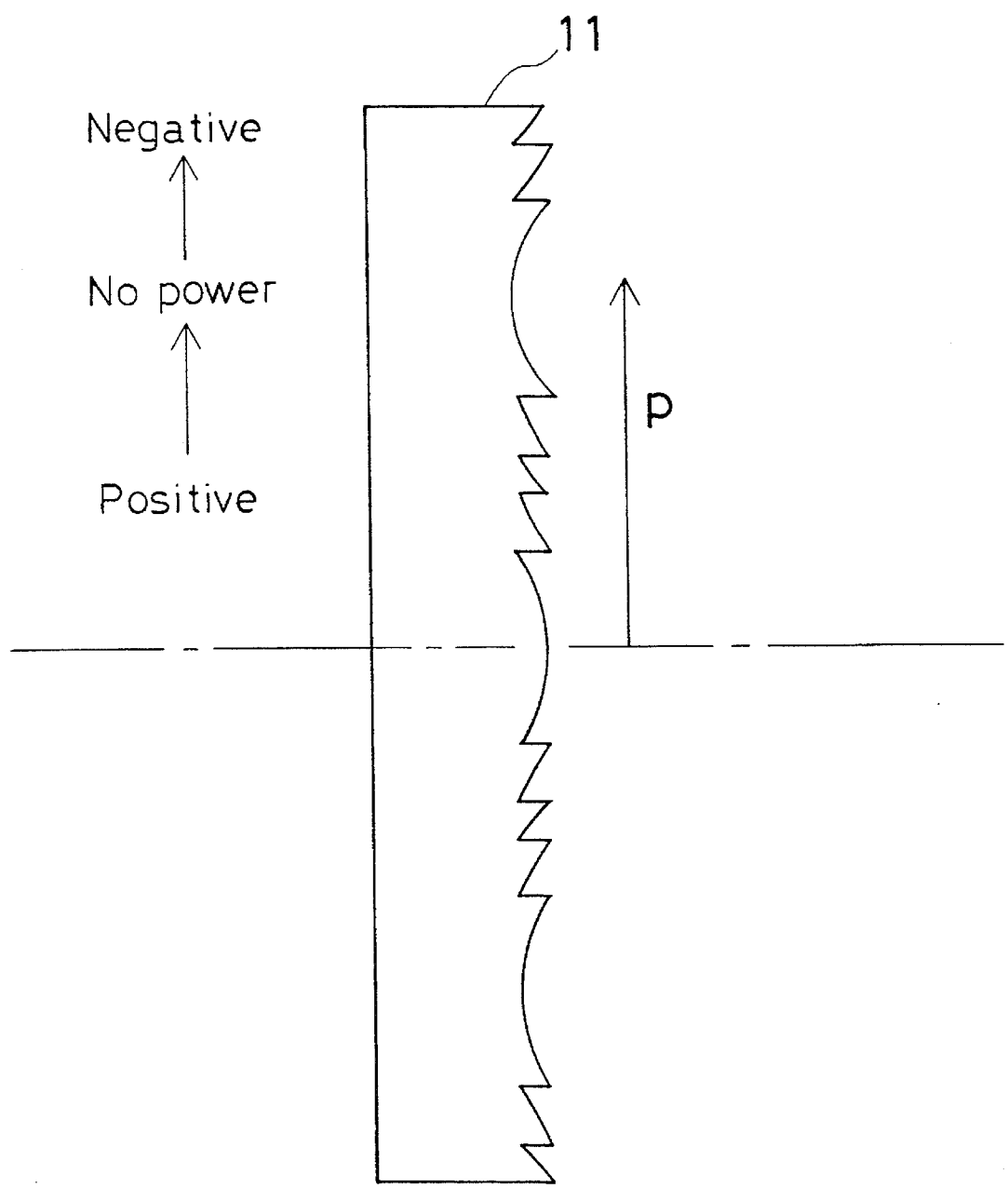
FIG. 9 is a conceptual view for explanation of a blaze angle of the DOE used in the projection lens system of the first example of the present invention.

In general, a DOE is blazed in order to obtain high diffraction efficiency. FIG. 9 conceptually shows the way in which the pitch arrangement shown in FIG. 8 changes in the radial direction of the DOE. In FIG. 9, a cross-section of the DOE 11 in this example is exaggeratedly shown. The DOE 11 has concentric grooves, which form a sawtooth-shaped cross-sectional configuration. In this example, the DOE 11 has a positive power in the vicinity of the optical axis. Thus, in the paraxial region, the grooves have a sawtooth cross-sectional configuration in which each groove surface slants outwardly from the optical axis side. The groove pitch gradually changes as the distance from the optical axis increases toward the periphery of the DOE 11 such that the groove pitch first gradually decreases, but it gradually increases from a halfway position. Further, the convex configuration is inversely changed to a concave configuration at a position where the height from the optical axis is p. As a result, the blaze angle (i.e., the inclination angle of the slant surfaces) becomes opposite to that at the inner side of the position of the height p. Thus, the groove surfaces slant toward the optical axis from the outer side. The inversion of the cross-sectional configuration is shown as inversion of the sign of the pitch in FIG. 8. That is, at the inner side of the position of the height p, the power is positive; at the outer side of the position of the height p, the power is negative; and at the position of the height p, the power is zero.

Although the DOE 11 shown in FIG. 9 has a blazed sawtooth cross-sectional configuration, the cross-sectional configuration of the DOE 11 may be approximated to the illustrated one by multi-level steps (see FIG. 4).

The aberration correcting action realized by a pitch arrangement such as that shown in FIG. 8 will be explained below.

It will be understood from Table 1 that the DOE 11 in this example performs great aberration correction, and the aberration correction is effected by not spherical action but aspherical action produced by a pitch arrangement in which the DOE 11 has a positive power in a paraxial region thereof, and the positive power continuously changes to a negative power as the distance from the optical axis of the DOE 11 increases toward the periphery thereof, as described above.

The DOE 11 in this example produces large counter aberrations, which are opposite in sign to spherical aberration, coma, astigmatism and distortion that are produced in the quartz lenses. As a result, the spherical aberration, coma, astigmatism and distortion in the entire lens system are extremely effectively corrected.

As has been described above, all the Seidel's five aberrations in the projection lens system 10 are effectively corrected by using the DOE 11 according to the present invention, which has the above-described pitch arrangement.

Although the foregoing description is concerned with the aberrations of the third order, the DOE 11 having the described pitch arrangement is also capable of effectively correcting higher-order aberrations, e.g., minus higher-order spherical aberration produced by the refracting lenses. Consequently, a lens system of favorable performance can be obtained, as shown in the aberration diagram of FIG. 7.

Further, since the DOE 11 has a positive power in a paraxial region thereof, it also corrects axial chromatic aberration produced by the refracting lenses. For example, if this lens system is used for light of wavelength 248.38.±0.005 nm, an axial chromatic aberration of ±1.1 μm is produced by the quartz lenses. In this case, however, the DOE 11 produces a counter chromatic aberration of ±0.2 μm to thereby correct the chromatic aberration.

Figure 11:
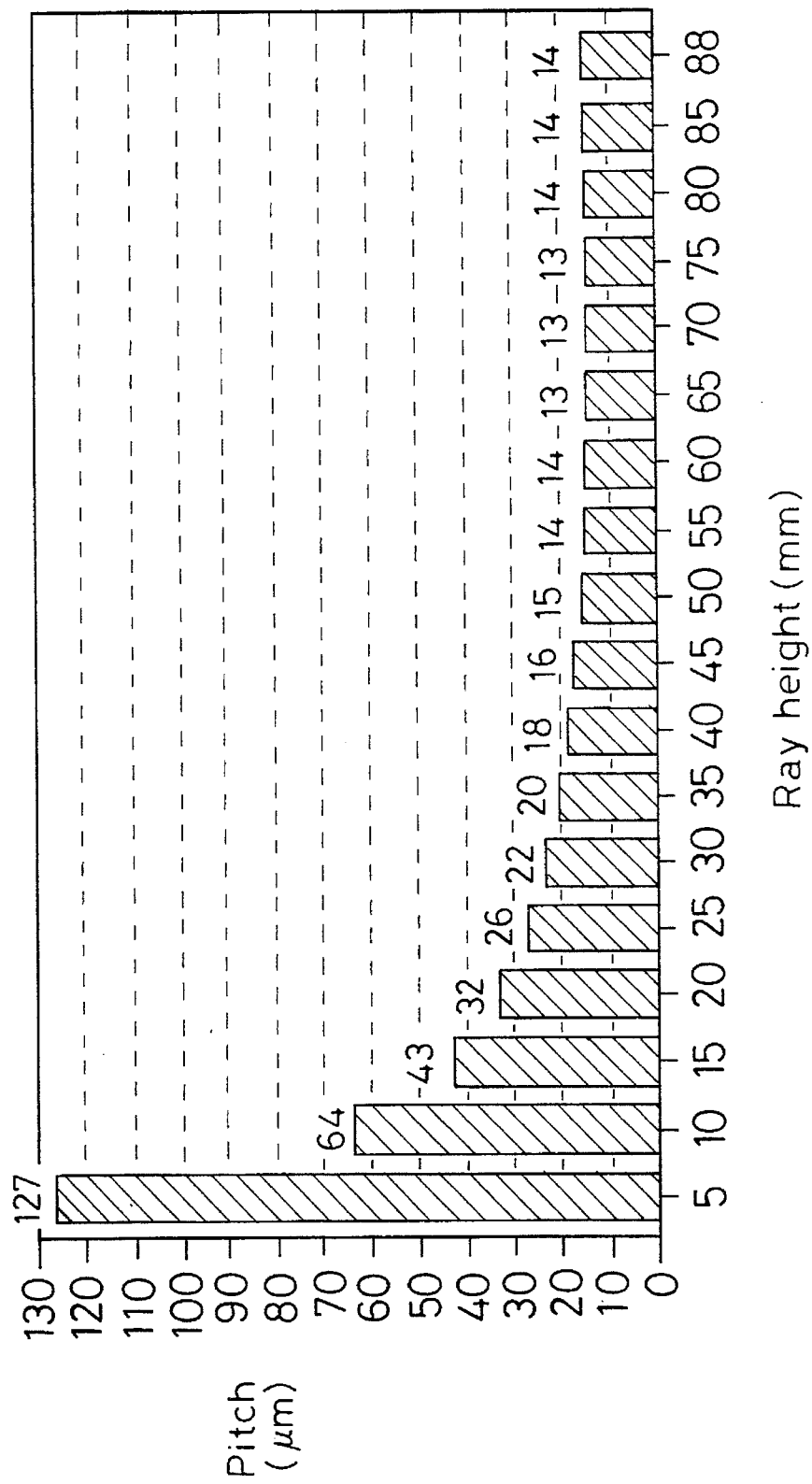
FIG. 11 is a graph showing a pitch distribution on the DOE that performs a convex lens action.

If the peripheral portion of the effective aperture diameter region of the DOE 11 has no concave lens action but convex lens action in the same way as the other portion, the aberration correction capability is insufficient. FIG. 10 graphically shows various aberrations in a projection lens system wherein the peripheral portion of the effective-diameter region of the DOE 11 has convex lens action, in a similar manner to FIG. 7, and FIG. 11 shows a pitch distribution on this DOE 11 in a similar manner to FIG. 8.

As will be understood by making a comparison between FIGS. 7(a) to 7(i) and 10(a) to 10(i), when the DOE has only convex lens action, the aberration correcting capability of the DOE is not sufficient, and the performance of the lens system is also insufficient. Although the DOE 11 in this example has a diffraction surface provided on one surface of a plate having parallel flat surfaces on account of the ease of production, it is even more preferable to form a diffraction surface on a curved surface, e.g., a spherical or aspherical surface. The fact that a diffraction surface is formed on a surface of a plate having parallel flat surfaces means that no bending of the ultra-high index lens is effected; this limits the aberration correcting capability. In this regard, if a diffraction surface is formed on a curved surface, the cemented surface of the cemented lens, which is composed of a refracting lens and an ultra-high index lens, also contributes to the aberration correction. Thus, it is favorable from the viewpoint of aberration correction.

Although this example uses only one DOE, two or more DOEs may be used, as a matter of course. It is rather preferable to use a plurality of DOEs because the aberration correcting effect is enhanced by increasing the number of DOEs used.

In addition, it is preferable for the projection lens system in this example to satisfy the following condition:

$$h/2 \leq p \quad (1)$$

where h is the effective aperture radius of the DOE, and p is the distance from the optical axis to the no-power portion of the DOE.

If p is smaller than the lower limit of the condition (1), the aberration correcting quantity of the DOE becomes extremely large, so that the concave lens action at the periphery of the effective aperture diameter region of the DOE becomes excessively strong. As a result, a pitch on the order of submicrons is needed, and the production of the DOE becomes extremely difficult.

Figure 12:
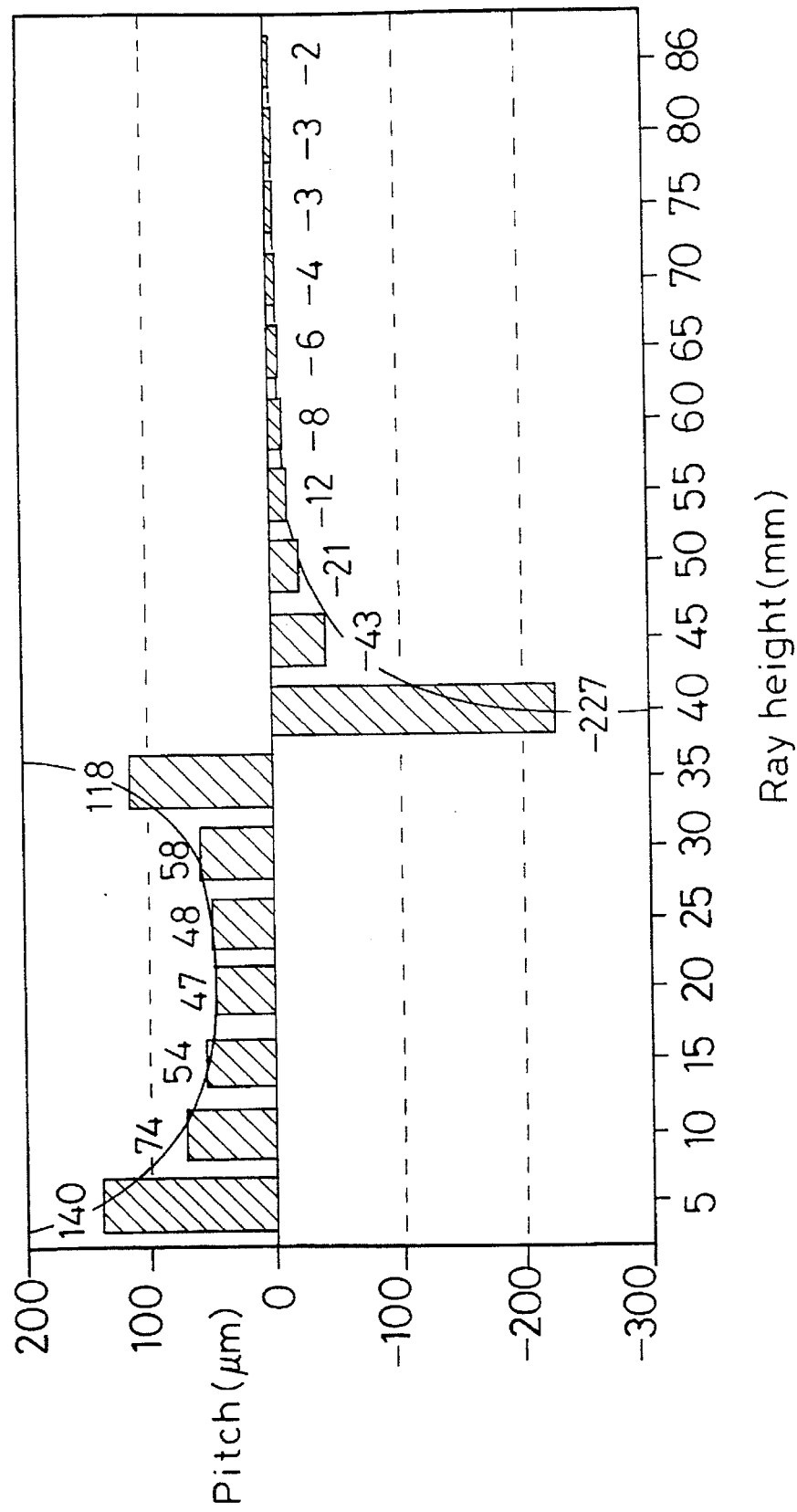
FIG. 12 is a graph showing a pitch distribution on the DOE when the field number (diameter of image field) of the projection lens system in the first example is enlarged.
Figure 13:
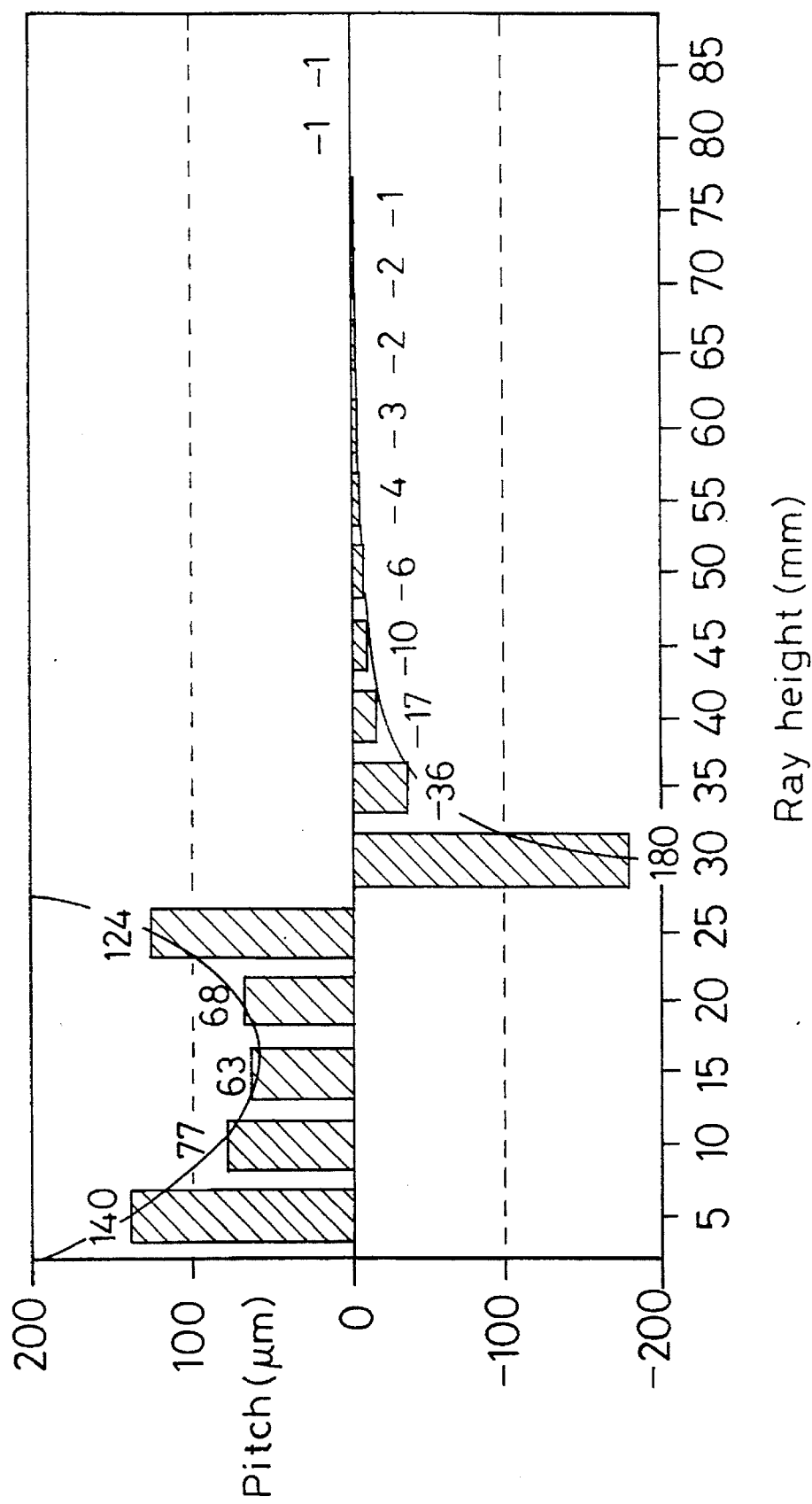
FIG. 13 is a graph showing a pitch distribution on the DOE when the field number (diameter of image field) of the projection lens system in the first example is further enlarged.

Table 1 shows the coefficients of third-order aberrations produced in the DOE and those in the entire lens system when the field number of the projection lens system in this example is actually enlarged. FIGS. 12 and 13 show changes in the pitch distribution caused by the enlargement of the field number (FN 48 and FN 60).

TABLE 2

Changes of the focal length of the DOE when the field number of the projection lens system (FN 36) in the first example is enlarged (FN 46 and FN 60) (unit: mm)

|  | FN 36 (first example) | FN 48 | FN 60 |
| --- | --- | --- | --- |
| Focal length of DOE | 2790 | 2762 | 2731 |

As shown in Table 2, there is substantially no change in the focal length of the DOE even when the field number is enlarged. In other words, there is no substantial change in the spherical action. However, the aberrations in the refracting lenses (quartz lenses), which increase with the enlargement of the field number, are effectively corrected by the DOE, as shown in Table 1. This great advantage is obtained by the aspherical action of the DOE having the above-described pitch arrangement. As the field number is enlarged, the aspherical action of the DOE increases, thus producing large counter aberrations which cancel the aberrations produced by the refracting lenses (quartz lenses). As a result, the projection lens system is effectively corrected for aberrations.

However, as the aspherical action of the DOE increases, the minimum pitch at the periphery of the DOE becomes extremely small, as shown in FIGS. 12 and 13, and the production of the DOE becomes extremely difficult, although the aberration correcting capability increases. Therefore, the condition (1) should preferably be satisfied.

In this example, when p=0.65 h, the minimum pitch is 5.4 μm, as shown in FIG. 8, which gives rise to no production problem.

As has been described above, it is possible according to this example to realize a projection lens system having a high resolving power and a wide exposure area (i.e., NA is 0.48, and the diameter of the exposure area is 36 mm) with the wafer-reticle distance kept at a short distance of 800 mm.

It should be noted that in the numerical data described later, the 33-rd surface is an aspherical surface, and the aspherical configuration is defined by Eq. (5). In addition, the 31-st and 32-nd surfaces are surfaces of a substrate on which the DOE 11 is formed. The 33-rd and 34-th surfaces define an ultra-high index lens equivalent to the DOE 11.

(SECOND EXAMPLE)

Figure 14:
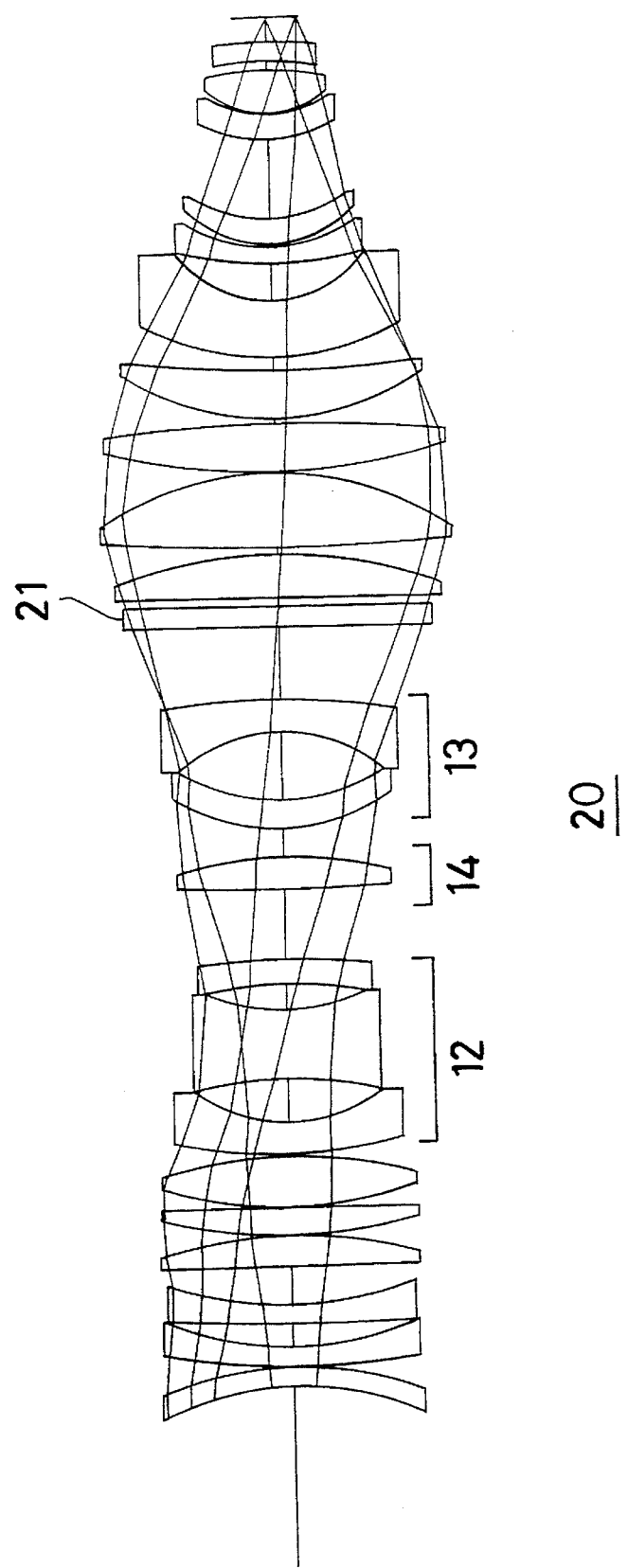
FIG. 14 is a sectional view of a projection lens system in a second example of the present invention.
Figure 15A:
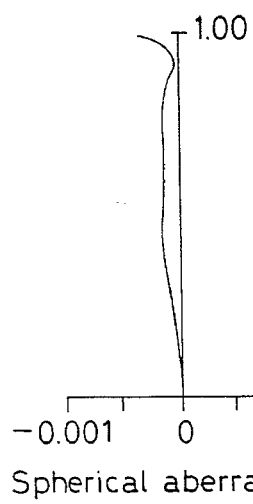
FIG. 15(a) to 15(i) graphically show various aberrations in the second example in a similar manner to FIGS. 7(a) to 7(i).
Figure 15B:
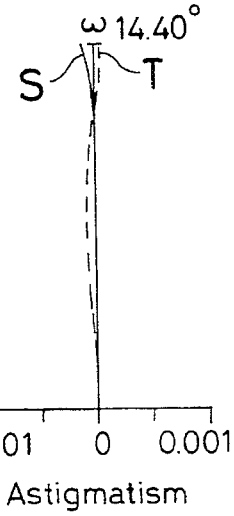
Figure 15C:
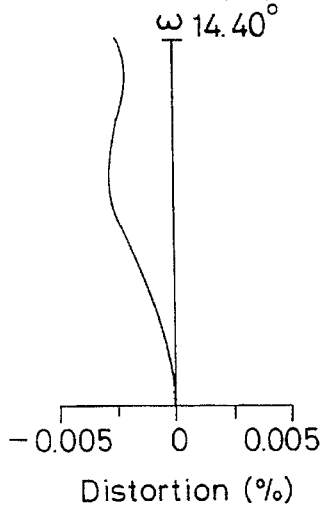
Figure 15D:
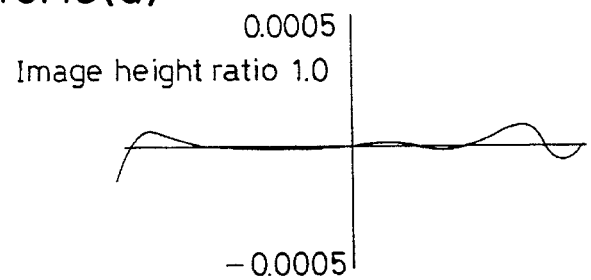
Figure 15E:
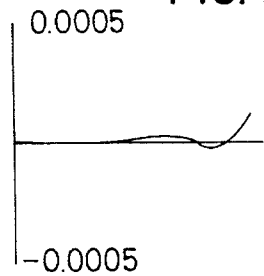
Figure 15F:
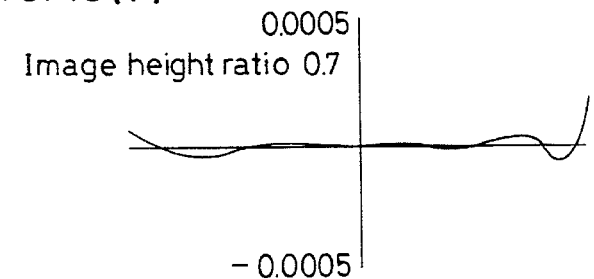
Figure 15G:
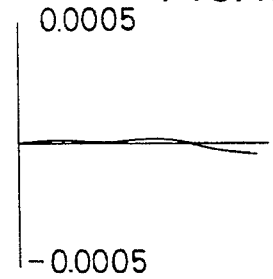
Figure 15H:
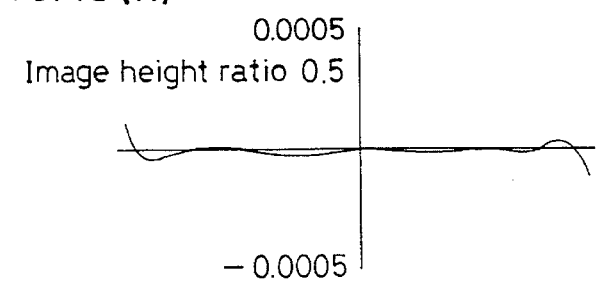
Figure 15I:
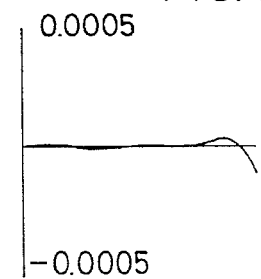
Figure 16:
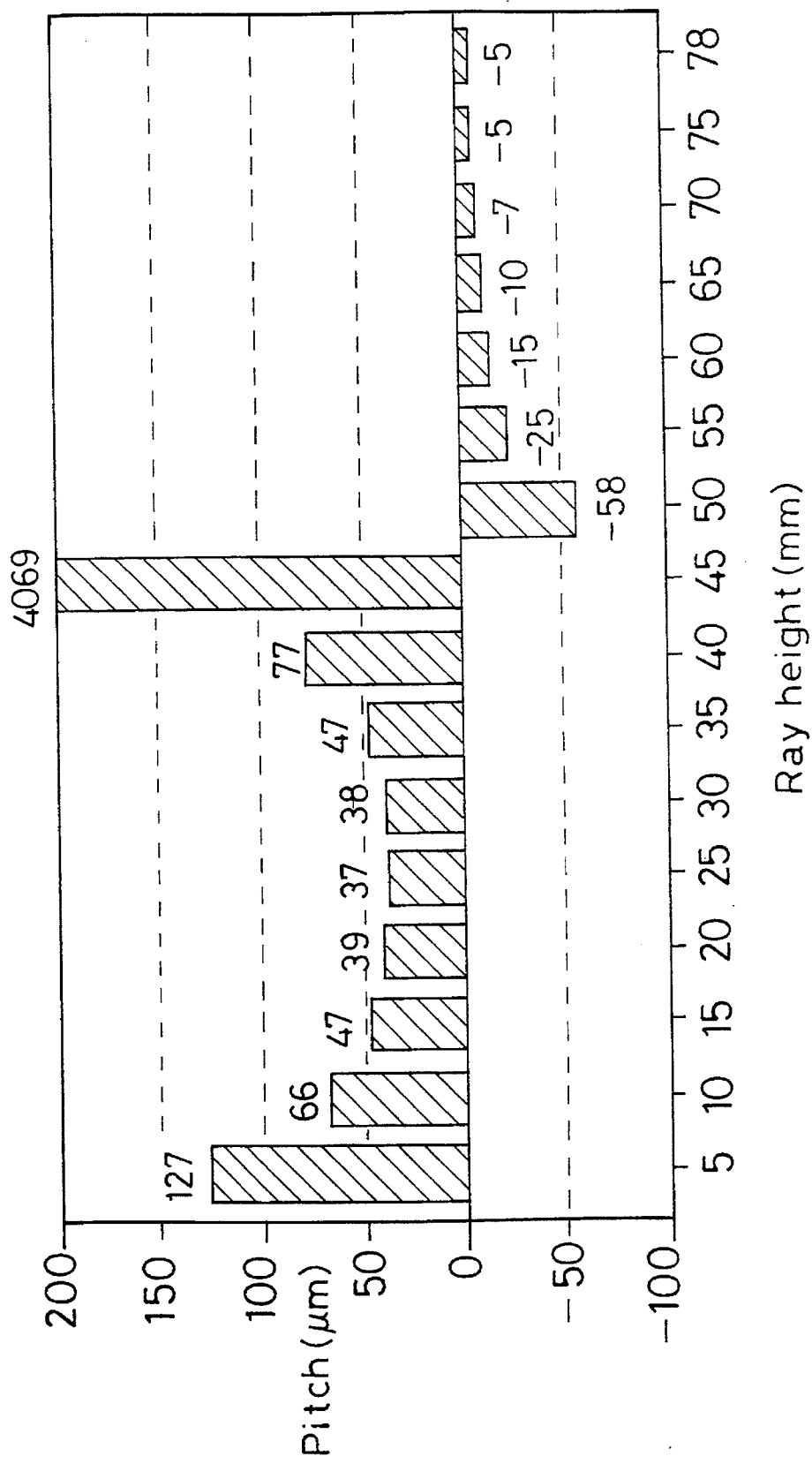
FIG. 16 is a graph showing a pitch distribution on a DOE used in the second example.

Numeral data on a projection lens system 20 in this example are shown later. FIG. 14 is a sectional view of the projection lens system 20, and FIG. 15(a) to 15(i) graphically show various aberrations in the projection lens system 20 in a similar manner to FIGS. 7(a) to 7(i). FIG. 16 shows the pitch arrangement of a DOE used in the projection lens system 20 of this example. In FIG. 14, reference numeral 21 denotes a DOE.

This example also places more importance on enlargement of the exposure area of the projection lens system 20 than correction of chromatic aberration in the same way as in the first example. The arrangement of refracting lenses (quartz lenses) is approximately the same as that in the first example. In this example, the DOE 21 is disposed at a position where the effective aperture diameter is relatively small. This arrangement is favorable from the manufacturing point of view because the size of the DOE 21 can be made relatively small.

In this case, since the DOE 21 lies in the vicinity of the pupil, large plus spherical aberration can be produced without substantially aggravating off-axis aberrations, i.e., coma, astigmatism, distortion and field curvature. As a result, it is possible to correct minus spherical aberration produced by the refracting lenses and to realize a projection lens system of excellent performance.

Further, since aberrations that are produced according to the increase of the power of the concave lenses are corrected by the DOE 21, the Petzval sum in the entire lens system is satisfactorily corrected.

In this example, p=0.57 h, which satisfies the condition (1). Thus, the groove pitch is practicable.

It should be noted that in the numerical data described later, the 27-th surface is an aspherical surface, and the aspherical configuration is defined by Eq. (5). In addition, the 25-th and 26-th surfaces are surfaces of a substrate on which the DOE 21 is formed. The 27-th and 28-th surfaces define an ultra-high index lens equivalent to the DOE 21.

(THIRD EXAMPLE)

Figure 17:
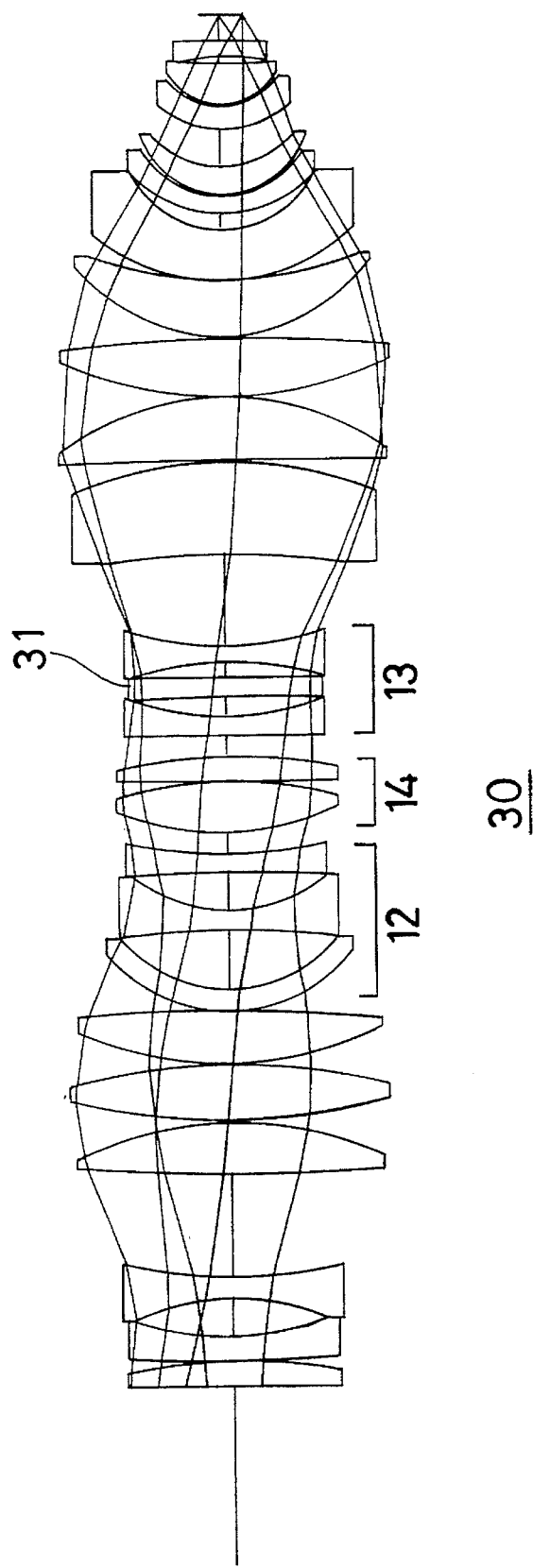
FIG. 17 is a sectional view of a projection lens system in a third example of the present invention.
Figure 18A:
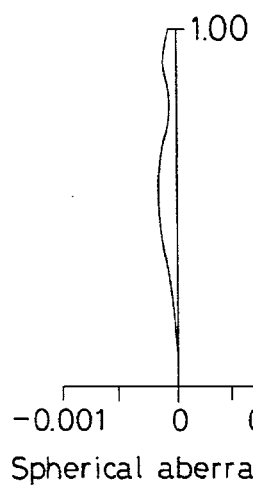
FIGS. 18(a) to 18(i) graphically show various aberrations in the third example in a similar manner to FIGS. 7(a) to 7(i).
Figure 18B:
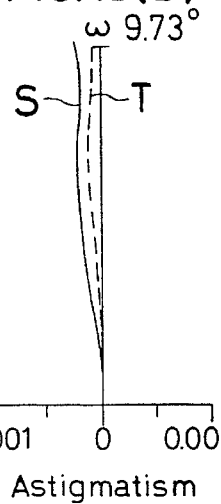
Figure 18C:
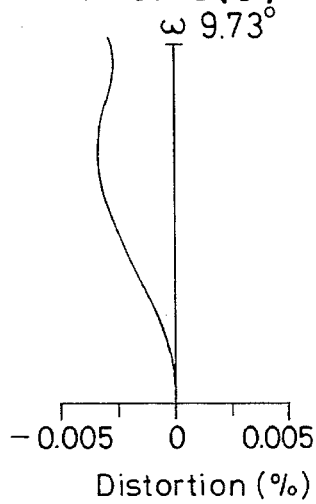
Figure 18D:
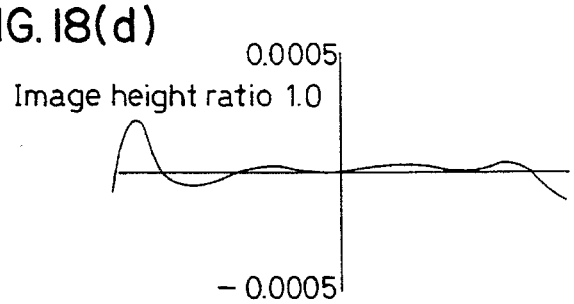
Figure 18E:
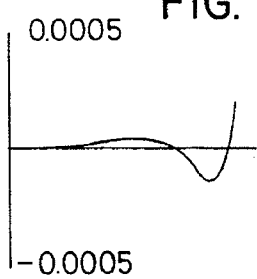
Figure 18F:
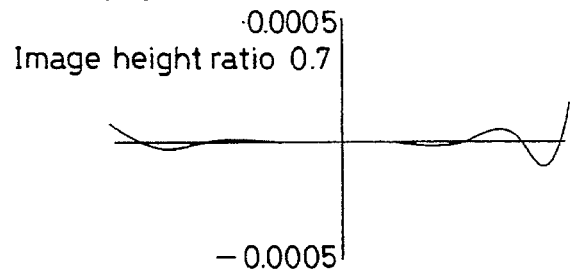
Figure 18G:
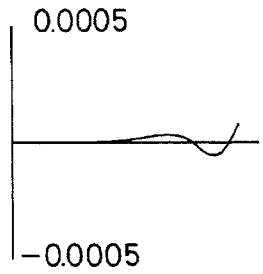
Figure 18H:
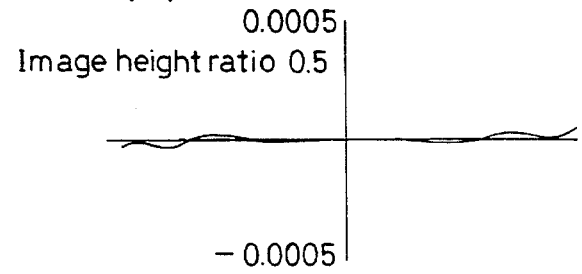
Figure 18I:
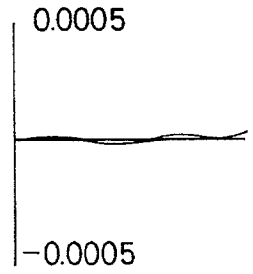
Figure 19:
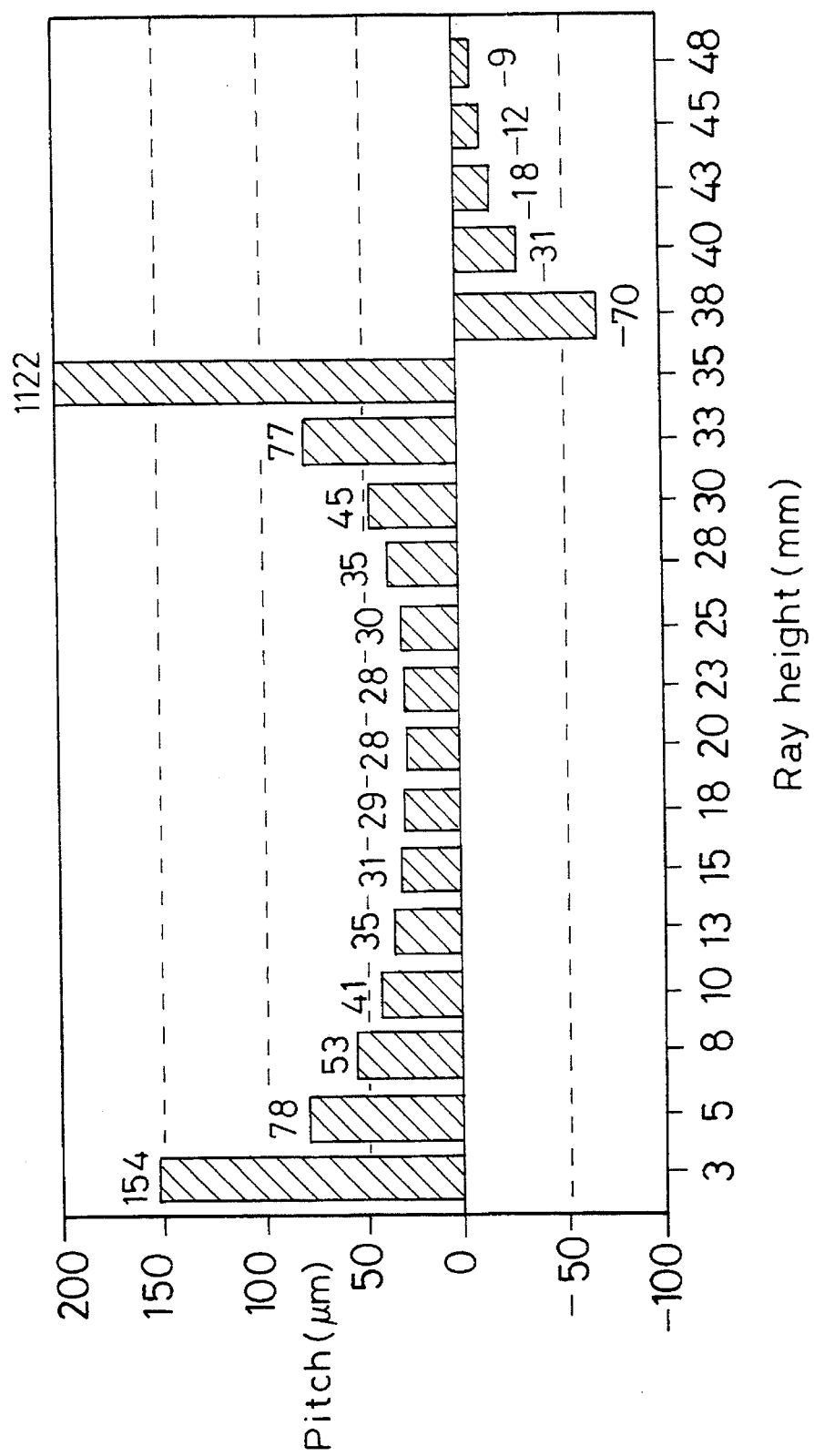
FIG. 19 is a graph showing a pitch distribution on a DOE used in the third example.

Numeral data on a projection lens system 30 in this example are shown later. FIG. 17 is a sectional view of the projection lens system 30, and FIGS. 18(a) to 18(i) graphically show various aberrations in the projection lens system 30 in a similar manner to FIGS. 7(a) to 7(i). FIG. 19 shows the pitch arrangement of a DOE used in the projection lens system 30 of this example. In FIG. 17, reference numeral 31 denotes a DOE.

This example places more importance on enlargement of the NA of the projection lens system 30 than the correction of chromatic aberration. The arrangement of refracting lenses (quartz lenses) is approximately the same as that in the first example. When it is not desired to use a DOE having a very large size, the DOE 31 should be disposed at a position where the effective aperture diameter is relatively small, i.e., in the vicinity of the pupil, as in this example. This arrangement is favorable from the manufacturing point of view because there is no increase of the effective aperture diameter of the DOE 31 which would otherwise be caused by enlargement of the field number, and hence the minimum pitch of the DOE 31 is unlikely to become very small.

In this example also, great aberration correction is made by the aspherical action of the DOE 31 having the above-described pitch arrangement. The DOE 31 in this example also produces large counter aberrations, which are opposite in sign to spherical aberration, coma, astigmatism and distortion that are produced in the refracting lenses. Consequently, it is possible to effectively correct various aberrations, particularly spherical aberration, which gives rise to a problem in design of a projection lens system having a large NA. The use of the DOE 31 enables field curvature to be satisfactorily corrected in the same way as in the first and second examples.

In this example, p=0.74 h, which satisfies the condition (1). Thus, the groove pitch is practicable.

It should be noted that in the numerical data described later, the 27-th surface is an aspherical surface, and the aspherical configuration is defined by Eq. (5). In addition, the 25-th and 26-th surfaces are surfaces of a substrate on which the DOE 31 is formed. The 27-th and 28-th surfaces define an ultra-high index lens equivalent to the DOE 31.

Numerical data in the examples will be shown below. It should be noted that the surface Nos. are the consecutive numbers of the lens surfaces counted from the object side. The surface Nos. include the Nos. of the lens surfaces of the ultra-high index lenses 11, 21 and 31 equivalent to the DOEs, as described above. R denotes the radius of curvature, d the surface separation, and VM the vitreous material. DOE in the column of "VM" shows an imaginary vitreous material constituting an ultra-high index lens. It is assumed that the refractive index of the imaginary vitreous material constituting the ultra-high index lens is 10001, and the refractive index of quartz is 1.508379. In addition, λ denotes the wavelength, NA the numerical aperture, φ the diameter of the exposure area, □ the length of one side of the exposure area, β the magnification, and OID the object-image distance.

EXAMPLE 1

λ=248 nm, N A=0.48, φ=36 mm (□25 mm), β=⅕, O I D=800 mm

| Surface No. | R | d | VM |
|---|---|---|---|
| 1 | −161.715 | 10.000 | Quartz |
| 2 | −199.952 | 0.100 | |
| 3 | 340.968 | 10.000 | Quartz |
| 4 | 142.471 | 11.075 | |
| 5 | 354.193 | 10.000 | Quartz |
| 6 | 176.097 | 12.704 | |
| 7 | 1212.997 | 18.058 | Quartz |
| 8 | −256.398 | 0.100 | |
| 9 | 203.590 | 20.354 | Quartz |
| 10 | −1353.068 | 0.100 | |
| 11 | 175.770 | 27.036 | Quartz |
| 12 | −251.160 | 0.100 | |
| 13 | 1001.806 | 10.000 | Quartz |
| 14 | 72.058 | 23.310 | |
| 15 | −164.443 | 10.000 | Quartz |
| 16 | 121.239 | 34.141 | |
| 17 | 374.728 | 10.000 | Quartz |
| 18 | 204.012 | 37.747 | |
| 19 | 178.226 | 19.926 | Quartz |
| 20 | −384.487 | 0.100 | |
| 21 | 537.059 | 11.469 | Quartz |
| 22 | −923.608 | 0.100 | |
| 23 | 254.543 | 10.000 | Quartz |
| 24 | 147.932 | 23.858 | |
| 25 | −103.925 | 10.000 | Quartz |
| 26 | 336.922 | 51.251 | |
| 27 | 29381.534 | 17.922 | Quartz |
| 28 | −291.819 | 14.167 | |
| 29 | 674.998 | 32.585 | Quartz |
| 30 | −203.019 | 0.100 | |
| 31 | ∞ | 10.000 | Quartz (Substrate of DOE) |
| 32 | ∞ | 0.000 | |
| 33 (Aspheric) | $2.79043 \times 10^7$ | 0.000 | DOE |
| 34 | ∞ | 0.100 | |
| 35 | 439.333 | 30.382 | Quartz |
| 36 | −262.348 | 0.100 | |
| 37 | 109.366 | 30.642 | Quartz |
| 38 | 319.908 | 7.633 | |
| 39 | 186.858 | 41.685 | Quartz |
| 40 | 56.280 | 13.586 | |
| 41 | 124.936 | 10.000 | Quartz |
| 42 | 72.744 | 0.100 | |
| 43 | 56.018 | 13.034 | Quartz |
| 44 | 70.161 | 29.956 | |
| 45 | 77.762 | 10.000 | Quartz |
| 46 | 51.774 | 0.313 | |
| 47 | 46.306 | 20.929 | Quartz |
| 48 | −173.472 | 3.236 | |
| 49 | −102.641 | 10.000 | Quartz |
| 50 | −308.947 | | |

Aspherical Coefficients
33th surface
R = $2.79043 \times 10^7$
k = −1
A = $-2.73103 \times 10^{-12}$
B = $-1.50751 \times 10^{-17}$
C = $-2.53992 \times 10^{-22}$
D = $-1.91297 \times 10^{-26}$

EXAMPLE 2

λ=248 nm, N A=0.48, φ=33 mm (□23 mm), β=⅕, O I D=800 mm

| Surface No. | R | d | VM |
|---|---|---|---|
| 1 | −158.037 | 10.000 | Quartz |
| 2 | −195.978 | 0.100 | |
| 3 | 418.017 | 10.000 | Quartz |
| 4 | 150.691 | 10.660 | |
| 5 | 593.972 | 10.000 | Quartz |
| 6 | 184.051 | 18.792 | |
| 7 | 1355.015 | 15.227 | Quartz |
| 8 | −312.234 | 0.100 | |
| 9 | 283.224 | 14.666 | Quartz |
| 10 | −26521.348 | 0.100 | |
| 11 | 193.354 | 26.735 | Quartz |
| 12 | −226.777 | 0.100 | |
| 13 | 227.211 | 17.701 | Quartz |
| 14 | 82.978 | 19.646 | |
| 15 | −206.100 | 33.573 | Quartz |
| 16 | 97.028 | 15.098 | |
| 17 | −176.795 | 10.000 | Quartz |
| 18 | −444.638 | 36.711 | |
| 19 | 986.849 | 15.336 | Quartz |
| 20 | −202.844 | 12.149 | |
| 21 | 94.405 | 14.535 | Quartz |
| 22 | 90.169 | 33.580 | |
| 23 | −86.788 | 19.011 | Quartz |
| 24 | −313.565 | 36.723 | |
| 25 | ∞ | 10.000 | Quartz (Substrate of DOE) |
| 26 | ∞ | 0.000 | |
| 27 (Aspheric) | $2.52640 \times 10^7$ | 0.000 | DOE |
| 28 | ∞ | 4.489 | |
| 29 | −2416.732 | 22.039 | Quartz |
| 30 | −213.149 | 3.841 | |
| 31 | 2712.715 | 33.650 | Quartz |
| 32 | −166.291 | 0.100 | |
| 33 | 265.058 | 25.092 | Quartz |
| 34 | −898.699 | 2.169 | |
| 35 | 131.586 | 25.030 | Quartz |
| 36 | 456.448 | 4.724 | |
| 37 | 135.521 | 30.512 | Quartz |
| 38 | 60.945 | 15.469 | |
| 39 | 153.381 | 10.000 | Quartz |
| 40 | 83.658 | 0.100 | |
| 41 | 59.070 | 12.582 | Quartz |
| 42 | 69.362 | 40.454 | |
| 43 | 88.193 | 12.159 | Quartz |
| 44 | 53.372 | 0.109 | |
| 45 | 46.865 | 21.483 | Quartz |
| 46 | −214.592 | 3.453 | |
| 47 | −110.371 | 10.000 | Quartz |
| 48 | −372.046 | | |

Aspherical Coefficients
27th surface
R = $2.52640 \times 10^7$
k = −1
A = $-5.11751 \times 10^{-12}$
B = $8.54374 \times 10^{-17}$
C = $-1.44876 \times 10^{-21}$
D = $-2.04374 \times 10^{-27}$

EXAMPLE 3

λ=248 nm, N A=0.60, φ=24 mm (□17 mm), β=⅕, O I D=800 mm

| Surface No. | R | d | VM |
|---|---|---|---|
| 1 | −7183.426 | 12.036 | Quartz |
| 2 | −277.966 | 0.100 | |
| 3 | 1753.436 | 10.000 | Quartz |
| 4 | 133.116 | 20.892 | |

-continued

| Surface No. | R | d | VM |
|---|---|---|---|
| 5 | −129.156 | 10.000 | Quartz |
| 6 | 246.617 | 51.556 | |
| 7 | 1186.050 | 26.334 | Quartz |
| 8 | −180.123 | 0.100 | |
| 9 | 281.287 | 27.319 | Quartz |
| 10 | −367.991 | 0.100 | |
| 11 | 171.041 | 26.232 | Quartz |
| 12 | −1814.658 | 0.100 | |
| 13 | 83.495 | 10.000 | Quartz |
| 14 | 68.446 | 31.840 | |
| 15 | −400.118 | 10.000 | Quartz |
| 16 | 78.082 | 18.004 | |
| 17 | −14254.367 | 10.000 | Quartz |
| 18 | 227.084 | 11.187 | |
| 19 | 142.747 | 25.105 | Quartz |
| 20 | −220.789 | 0.100 | |
| 21 | −17980.404 | 12.758 | Quartz |
| 22 | −253.596 | 11.366 | |
| 23 | −2838.911 | 10.000 | Quartz |
| 24 | 155.055 | 8.134 | |
| 25 | ∞ | 10.000 | Quartz (Substrate of DOE) |
| 26 | ∞ | 0.000 | |
| 27 (Aspheric) | $1.54177 \times 10^7$ | 0.000 | DOE |
| 28 | ∞ | 8.135 | |
| 29 | −153.870 | 10.000 | Quartz |
| 30 | 187.267 | 44.249 | |
| 31 | −477.781 | 46.399 | Quartz |
| 32 | −200.350 | 1.458 | |
| 33 | −1841.575 | 32.478 | Quartz |
| 34 | −136.949 | 0.100 | |
| 35 | 219.727 | 26.348 | Quartz |
| 36 | −1006.903 | 0.100 | |
| 37 | 94.856 | 28.649 | Quartz |
| 38 | 189.397 | 0.100 | |
| 39 | 106.287 | 26.252 | Quartz |
| 40 | 52.251 | 6.996 | |
| 41 | 60.567 | 10.000 | Quartz |
| 42 | 50.025 | 0.100 | |
| 43 | 46.763 | 14.474 | Quartz |
| 44 | 49.969 | 17.818 | |
| 45 | 59.808 | 10.000 | Quartz |
| 46 | 38.583 | 0.100 | |
| 47 | 35.807 | 20.164 | Quartz |
| 48 | 956.425 | 2.817 | |
| 49 | −141.699 | 8.000 | Quartz |
| 50 | −377.416 | | |

Aspherical Coefficients
27th surface
$R = 1.54177 \times 10^7$
$k = -1$
$A = -1.22700 \times 10^{-11}$
$B = -4.93739 \times 10^{-16}$
$C = 4.35829 \times 10^{-21}$
$D = 1.22769 \times 10^{-23}$ As has been described above, it is possible according to the present invention to provide a projection lens system with a high resolving power and a wide exposure area which is effectively corrected for various aberrations including chromatic aberration and which is compact and has minimal production problems in a case where there is a limitation on vitreous materials usable as a lens material.

What I claim is:

1. A diffractive optical element comprising, in order from an optical axis thereof toward a periphery thereof:

a first positive power region;

a second positive power region less powerful than said first positive power region;

a third positive power region more powerful than said second positive power region;

a no-power portion; and a negative power region;

said first positive power region, said second positive power region, said third positive power region, said no-power portion, and said negative power region being concentric.

2. The diffractive optical element as claimed by claim 1, wherein:

said diffractive optical element satisfies the following condition:

$h/2 \leq p$ where h is an effective aperture radius of said diffractive optical element, and p is a distance from said optical axis to said no-power portion of said diffractive optical element.

3. The diffractive optical element as claimed by claim 1, wherein:

said diffractive optical element satisfies the following condition:

$t/h \leq 0.4$ where h is an effective aperture radius of said diffractive optical element, and t is a height of a most off-axis chief ray in said diffractive optical element.

4. A projection lens system comprising:

a plurality of refracting lens elements; and a diffractive optical element, said diffractive optical element having a positive power in a paraxial region thereof, and having a pitch arrangement such that said positive power changes to a less positive power, and then to a nehative power as a distance from an optical axis thereof increases towards a periphery thereof, said diffractive optical element satisfying the following condition:

$t/h \leq 0.4$ where h is an effective aperture radius of said diffractive optical element, and t is a height of a most off-axis chief ray in said diffractive optical element.

5. The projection lens system according to claim 4, wherein said projection lens system further satisfies the following condition:

$t/h \leq 0.3$.

6. A projection lens system comprising:

a plurality of refracting lens elements including a first lens unit including at least two refracting lens elements having respective concave surfaces opposing each other; and a diffractive optical element having a positive power in a paraxial region thereof and having a pitch arrangement such that said positive power changes to a less positive power, and then to a negative power as a distance from an optical axis thereof increases towards a periphery thereof, said diffractive optical element being located between said first lens unit including said at least two refracting lens elements.

7. The projection lens system according to claim 6, further comprising:

a second lens unit of two refracting lens elements having respective concave surfaces opposing each other without any other refracting lens located therebetween.

8. The projection lens system according to claim 6, wherein:

said first lens unit includes at least one double-concave lens as a whole.

9. A projection lens system comprising:

a plurality of refracting lens elements including:

a first lens unit including a first set of lenses with respective concave surfaces opposing each other without any other refracting lens located therebetween, and a second lens unit including a second set of lenses with respective concave surfaces opposing each other without any other refracting lens located therebetween; and a diffractive optical element having a positive power in a paraxial region thereof, and having a pitch arrangement such that said positive power changes to a less positive power, and then to a negative power as a distance from an optical axis thereof increases towards a periphery thereof;

said first lens unit being located between said second lens unit and said diffractive optical element.

10. The projection lens system according to claim 9, further comprising:

a first positive lens located between said first lens unit and said diffractive optical element.

11. The projection lens system according to claim 10, further comprising:

a second positive lens located to a side of said diffractive optical element facing said second lens unit.

12. The projection lens system according to claim 9 or 11, wherein:

only an air separation is allowed to be substantially present between said first lens unit and said diffractive optical element.

13. The projection lens system according to claim 9, further comprising:

a plurality of positive lenses on a side of said diffractive optical element facing said second lens unit.

14. The projection lens system according to claim 7, 9, 10, 11, or 13, further comprising:

an third lens unit having positive power between said first lens unit and said second lens unit.

15. The projection lens system according to claim 14, wherein:

said third lens unit includes a plurality of positive lenses.

16. The projection lens system according to claim 7, 9, 10, 11, or 13, wherein:

at least one of said first lens unit and said second lens unit include at least one double-concave lens as a whole.

17. The projection lens system according to claim 4, 6 or 9, wherein:

said positive power of said diffraction optical element changes to said less positive power, and then increases in positive power before changing to said negative power, as said distance from said optical axis thereof increases towards said periphery thereof.

18. The projection lens system according to claim 4, 6 or 9, wherein said diffractive optical element further comprises:

a non-polar portion in a middle part of said diffractive optical element where said power becomes zero in a course of changing from said positive power to said negative power, said diffractive optical element satisfying the following condition:

$$h/2 \leq p$$

where h is an effective aperture radius of said diffractive optical element, and p is a distance from said optical axis to said no-power portion of said diffractive optical element.

19. The projection lens system according to claim 18, wherein:

said pitch of said diffractive optical element is smallest at a most peripheral portion of an effective aperture diameter region of said diffractive optical element.

20. The projection lens system according to claim 4, 6 or 9, wherein:

said plurality of refracting lens elements are made of a same vitreous material.

21. The projection lens system according to claim 20, wherein:

said vitreous material is quartz.

22. The projection lens system according to claim 4, 6 or 9, wherein:

said diffractive optical element and said plurality of refracting lens elements are made of quartz.

23. The projection lens system according to claim 4, 6 or 9, further comprising:

a light source that emits a radiation of wavelength not longer than 300 nm.

24. The projection lens system according to claim 23, wherein:

said light source is an excimer laser.

25. The projection lens system according to claim 24, wherein:

said light source is one selected from a group consisting of a KrF, an ArF, and an $F_2$ excimer laser.

26. The projection lens system according to claim 4, 6 or 9, wherein:

said diffractive optical element has a diffraction surface formed on a substrate which is a plate having parallel flat surfaces.

27. The projection lens system according to claim 4, 6 or 9, wherein:

said diffractive optical element has a blazed diffraction surface which is one of blazed and approximately blazed for light of a predetermined order of diffraction.

28. The projection lens system according to claim 27, wherein:

said blazed diffraction surface is approximated by multi-level steps.

* * * * *